US009161175B1

(12) United States Patent
Smith et al.

(10) Patent No.: US 9,161,175 B1
(45) Date of Patent: Oct. 13, 2015

(54) LOCATION TRANSITION DETERMINATION

(71) Applicant: Apple Inc., Cupertino, CA (US)

(72) Inventors: Brian Stephen Smith, Campbell, CA (US); David Benjamin Millman, Mountain View, CA (US); Robert Mayor, Half Moon Bay, CA (US); Vitali Lovich, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,863

(22) Filed: May 31, 2014

(51) Int. Cl.
*H04W 24/00* (2009.01)
*H04W 4/04* (2009.01)

(52) U.S. Cl.
CPC .......................................... *H04W 4/04* (2013.01)

(58) Field of Classification Search
CPC .......... H04W 4/02; H04W 4/023; H04W 4/04
USPC ...................................................... 455/404.2
See application file for complete search history.

(56) References Cited

U.S. PATENT DOCUMENTS

2012/0007779 A1    1/2012  Klepal et al.
2012/0274781 A1*  11/2012  Shet et al. .................... 348/169
2013/0131973 A1    5/2013  Friedler et al.
2014/0002307 A1    1/2014  Mole et al.
2014/0011518 A1*   1/2014  Valaee et al. ................ 455/456.1
2014/0194145 A1*   7/2014  Do et al. ...................... 455/456.3
2015/0065162 A1*   3/2015  Azami ......................... 455/456.1

OTHER PUBLICATIONS

International Search Report and Written Opinion in International Application PCT/US2015/032733, mailed Jul. 21, 2015, 12 pages.
Ficco and Russo, "A hybrid positioning system for technology-independent location-aware computing," Softw Pract Exper., 2009, 39:1095-1125.

* cited by examiner

*Primary Examiner* — Wayne Cai
(74) *Attorney, Agent, or Firm* — Fish & Richardson P.C.

(57) ABSTRACT

Methods, systems, and computer program product for location transition determination are described. A mobile device can use location fingerprint data and sensor readings to determine a transition of the mobile device into or out of a portion of a venue by using particle filters. When the mobile device determines that the mobile device is located at a first portion of the venue, e.g., on a given floor, the mobile device can introduce candidate locations, or particles, on a second portion of the venue and candidate locations outside of the venue. If estimated locations at the first portion of the venue do not converge, the mobile device can increase weight of the candidate locations that are outside of the first portion of the venue to detect possible transition to the second portion of the venue or to outside of the venue.

30 Claims, 30 Drawing Sheets

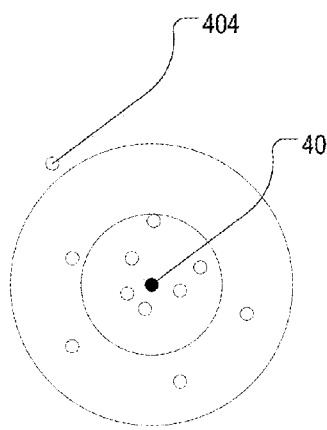
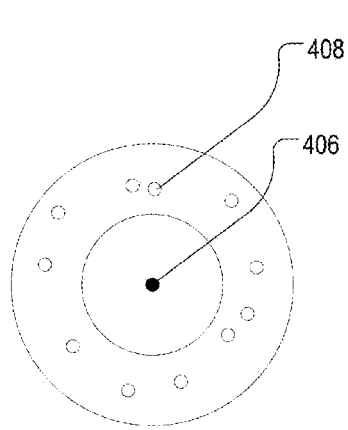
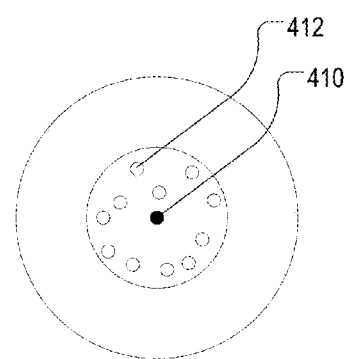
FIG. 4A        FIG. 4B        FIG. 4C
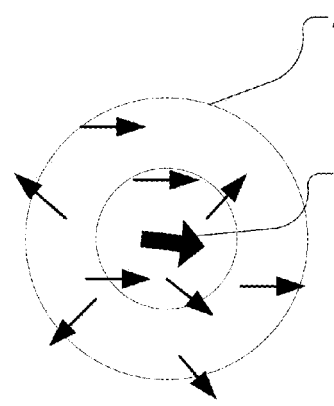
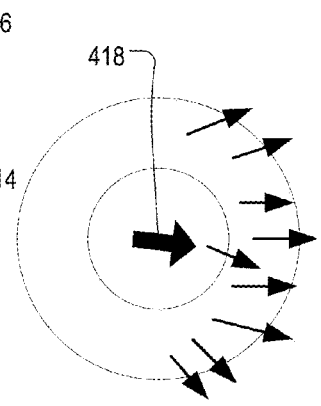
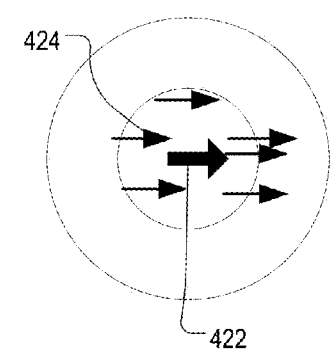
FIG. 4D        FIG. 4E        FIG. 4F

FIG. 18

LOCATION TRANSITION DETERMINATION

TECHNICAL FIELD

This disclosure relates generally to location determination.

BACKGROUND

Some mobile devices have features for determining a geographic location. For example, a mobile device can include a receiver for receiving signals from a global satellite system (e.g., global positioning system or GPS). The mobile device can determine a geographic location, including latitude and longitude, using the received GPS signals. In many places where a mobile device does not have a line of sight with GPS satellites, GPS location determination can be error prone. For example, a conventional mobile device often fails to determine a location based on GPS signals when the device is inside a building or tunnel. In addition, even if a mobile device has lines of sight with multiple GPS satellites, error margin of GPS location can be in the order of tens of meters. Such error margin may be too large, for example, for determining on which floor of a building the mobile device is located, and in which room of the floor the mobile device is located.

SUMMARY

Techniques for determining a location of a mobile device at a venue are described. A location server can receive survey data of a venue from one or more sampling devices. The survey data can include measurements of environment variables at various locations in the venue. The measurements are associated with respective locations. The location server can stitch the survey data received from multiple sampling devices. The location server can determine expected measurements of the signals at various locations in the venue. The location server can interpolate and extrapolate expected measurements for locations in the venue that have not been surveyed. The location server can store the expected measurements as location fingerprint data of the venue in a data store, and provide the location fingerprint data to mobile devices for location determination.

A system including a location server, or a mobile device, or both, can deduplicate the location fingerprint data. Deduplicating the location fingerprint data can include identifying correlated signal sources the signals of which are mutually dependent such that measurements of one signal source can be used to predict measurements of another. The system can determine a mutual information entropy value for each pair of signal sources, and identify the correlated signal sources, which have high mutual information entropy value. The system can adjust weights of the correlated signal sources in location determination.

The location server can determine a grid for survey data including measurements of environment variables at various locations in the venue. The grid can include multiple cells. The cells can cover the venue. The location server can associate each cell with a distribution of measurements of the signals from the environment variable in the cell. The location server can provide a representation of the grid, including the cells and corresponding distributions, to a mobile device for determining a location of the mobile device in the venue.

A mobile device can determine a location of the mobile device using a particle filter and a Kalman filter. The particle filter can filter candidate locations of the mobile device using measurements of environment variables in the venue. The Kalman filter can filter inputs from a sensor of the mobile device for measuring angular movement of the mobile device. The particle filter and the Kalman filter can be linked by heading of the mobile device. Output of the Kalman filter can be used to determine where to place particles, or candidate locations, in a next iteration of the particle filter. Output from the particle filter can be used to determine a center mode of the Kalman filter and to determine a bias of the sensor for measuring angular movement.

A mobile device can use location fingerprint data and sensor readings to determine a transition of the mobile device into or out of a portion of a venue by using particle filters. When the mobile device determines that the mobile device is located at a first portion of the venue, e.g., on a given floor, the mobile device can introduce candidate locations, or particles, on a second portion of the venue and candidate locations outside of the venue. If estimated locations at the first portion of the venue do not converge, the mobile device can increase weight of the candidate locations that are outside of the first portion of the venue to detect possible transition to the second portion of the venue or to outside of the venue.

The features described in this specification can be implemented to achieve the following advantages. Compared to conventional techniques for generating location fingerprint data, the surveying techniques described in this specification can result in higher quality location fingerprint data. The location fingerprint data can include data for unsurveyed areas of a venue, obtained through interpolation and extrapolation. The location fingerprint data can include deduplication information that can adjust weight of, for example, two signal sources placed next to one another, e.g., two antennas of a router to avoid overreliance on such signal sources. The deduplication can result in smaller data size and simpler calculations. The use of joint filters can reduce error rates and computation complexity for a particle filter for calculating location. The use of joint filters can correct errors of sensor readings measuring angular movement of the mobile device. The transition detection techniques can detect an exit from a venue by a mobile device, and switch to location determination using GPS or using location fingerprint data of another venue, avoiding wasting computing resources on calculating a location in the venue when the mobile device is no longer there.

The details of one or more implementations of the subject matter are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-4F illustrate exemplary models for configuring a particle filter.

FIG. 18 illustrates exemplary affinity matrices for weighting incoming survey data.

Like reference symbols in the various drawings indicate like elements.

DETAILED DESCRIPTION

Exemplary Location Determination

Figure 1:
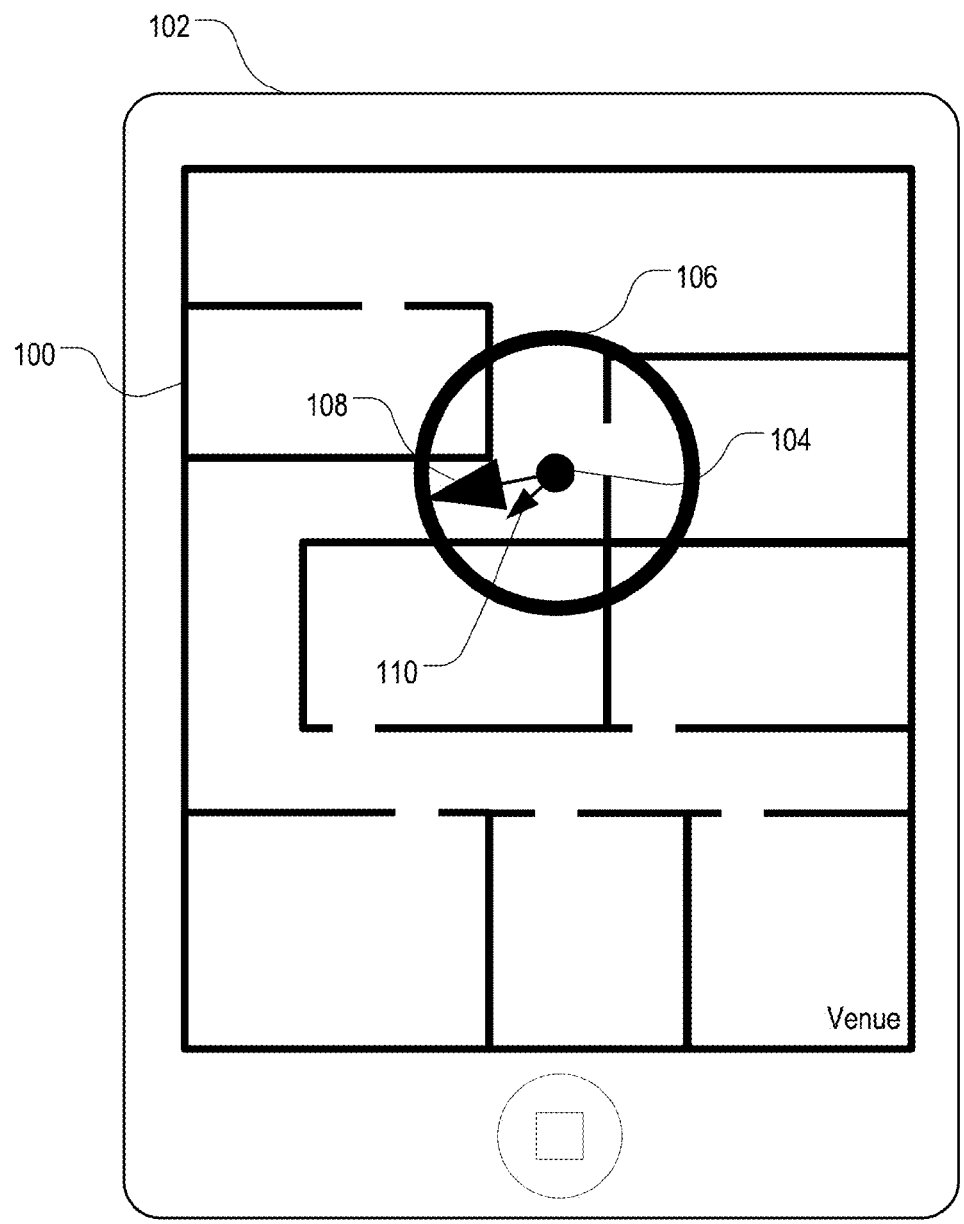
FIG. 1 is a diagram illustrating an exemplary user interface for indoor location determination.

FIG. 1 is a diagram illustrating an exemplary user interface 100 for indoor location determination. User interface 100 can be displayed on mobile device 102 configured to determine an indoor location. An indoor location can be a location where signals from a satellite positioning system, e.g., global positioning system (GPS) are unavailable, not sufficiently accurate, or otherwise undesirable for determining a location. The indoor location may be a location in venue that is, for example, a building, a cave, or a cruise ship. The indoor location may include latitude and longitude coordinates, or coordinates relative to the venue, e.g., X meters to the left and Y meters ahead of a reference point.

User interface 100 can include a map of at least a portion of the venue, and location indicator 104 overlaid on the map. Location indicator 104 is a marker, e.g., a dot, circle, or pin, that indicates an estimated location of mobile device 102 in the venue. Location indicator 104 may be surrounded by accuracy indicator 106. Accuracy indicator 106 can be a circle, square, or another geometric shape. A size of accuracy indicator 106 can indicate an estimated error margin of the location of mobile device 102, where a larger size indicates a larger estimated error margin.

Location indicator 104 and associated accuracy indicator 106 can move as the estimated location changes, e.g., when mobile device 102 is carried by a user walking in the venue. As mobile device 102 moves, location indicator 104 can be associated with heading indicator 108. Heading indicator 108 can be an arrow pointing from location indicator 104 to an estimated heading of mobile device 102. Mobile device 102 can determine the estimated location and estimated heading using measurements of signals received by mobile device 102 or using signals that are expected to be received but not actually received mobile device 102. The signals can be radio frequency (RF) signals. The estimated heading may be different from a heading determined using a gyroscope or a magnetometer, e.g., a mechanical or electronic compass, which may be subject to various interference. Mobile device 102 can overlay marker 110 on the map. Marker 110 can indicate a heading as determined using the gyroscope or a magnetometer on the map. Marker 110 can be an arrow pointing to the heading from location indicator 104. This arrow may point to a different direction than a direction of heading indicator 108.

Figure 2:
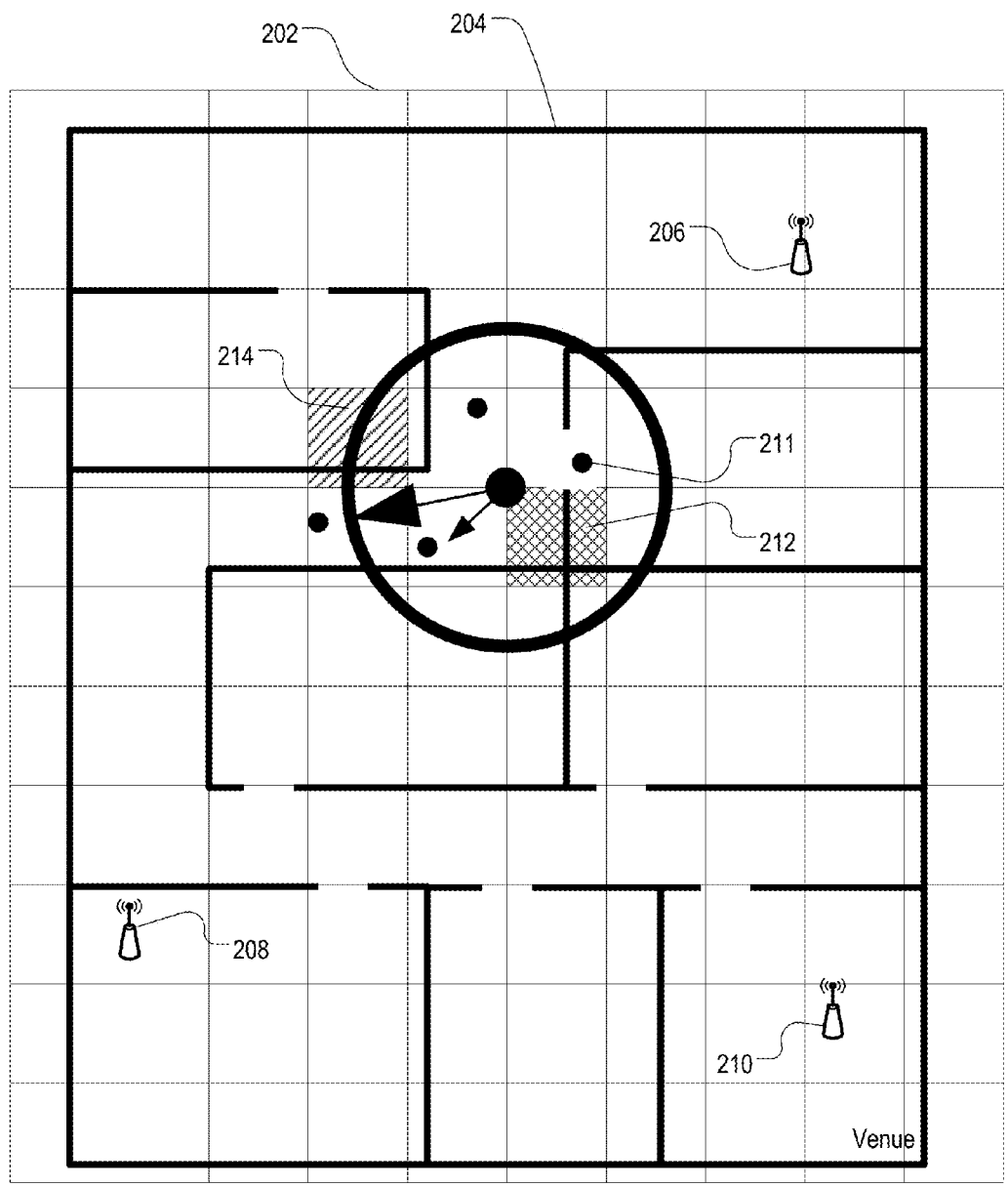
FIG. 2 illustrates exemplary techniques for determining a location at a venue.

FIG. 2 illustrates exemplary techniques for determining a location at a venue. Mobile device 102 (of FIG. 1) can determine the location of mobile device 102 by matching signal measurements of a sensor of mobile device 102 with location fingerprint data stored on mobile device 102. The location fingerprint data can include virtual grid 202 overlaying on venue 204. Virtual grid 202 can include multiple cells. Each cell can be a rectangular area, e.g., a square, that is associated with expected measurements of signals from one or more signal sources, e.g., signal sources 206, 208, and 210. Each of signal sources 206, 208, and 210 can be an RF signal source, e.g., a wireless access point (AP), an RF signal beacon, or a cellular site. Each of signal sources 206, 208, and 210 may or may not be located in venue 204.

Mobile device 102 can determine an estimated location of mobile device 102 using a Bayesian filter, e.g., a particle filter. Using the Bayesian filter, mobile device 102 can determine a probability density that mobile device 102 is located in each of the cells, and update the probability density using an observation that includes matching measurement of the RF signals with expected measurements of signals in the location fingerprint data. Each "particle" 211 can be a candidate location corresponding to a cell. A particle 211 can correspond to an expected measurement if mobile device is located in that cell. Mobile device 102 can determine a probability that mobile device 102 in each cell based on an observation that includes real time sensor readings. For example, mobile device 102 can determine that a probability that mobile device 102 is located in cell 212 has value X that is higher than a probability that mobile device 102 is located in cell 214 having value Y, which is higher than probabilities that mobile device 102 is located in other cells. Mobile device 102 can then determine an estimated location of mobile device 102 according the locations of cells 212 and 214.

Figure 3A:
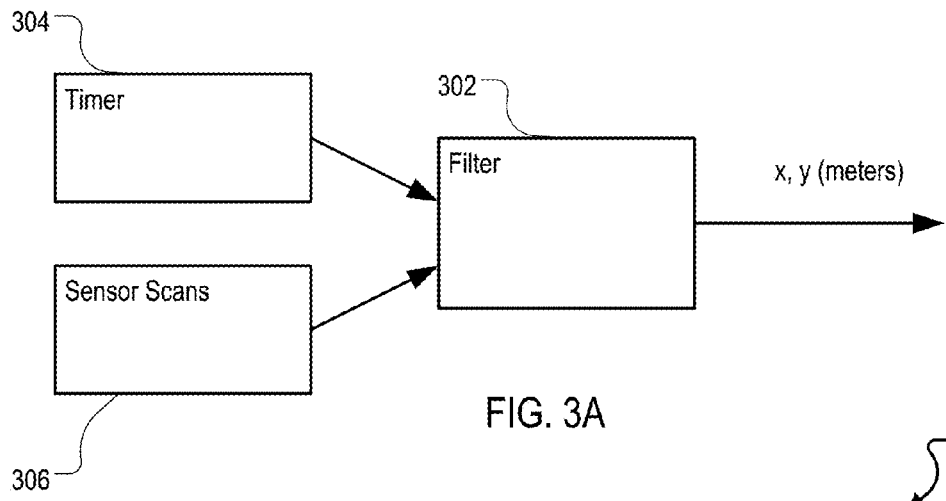
FIG. 3A is a block diagram illustrating schematics of an exemplary Bayesian filter used in indoor location determination.

FIG. 3A is a block diagram illustrating exemplary schematics of a Bayesian filter used in indoor location determination. The Bayesian filter can be particle filter 302. Particle filter 302 provides estimates of states of location of mobile device 102 (of FIG. 1) in a venue, e.g., venue 204 of FIG. 2 at discrete time t0, t1, t2 and so on. State space of particle filter 302 can be represented by x, y coordinates in meters relative to a reference point. The discrete time can be regulated using timer 304. Observations for particle filter 302 can be provided in sensor scans 306. Sensor scans 306 can include measurements, e.g., received signal strength indicators (RSSIs) or round trip time (RTT) of RF signals received by an RF signal receiver of mobile device 102.

Figure 3B:
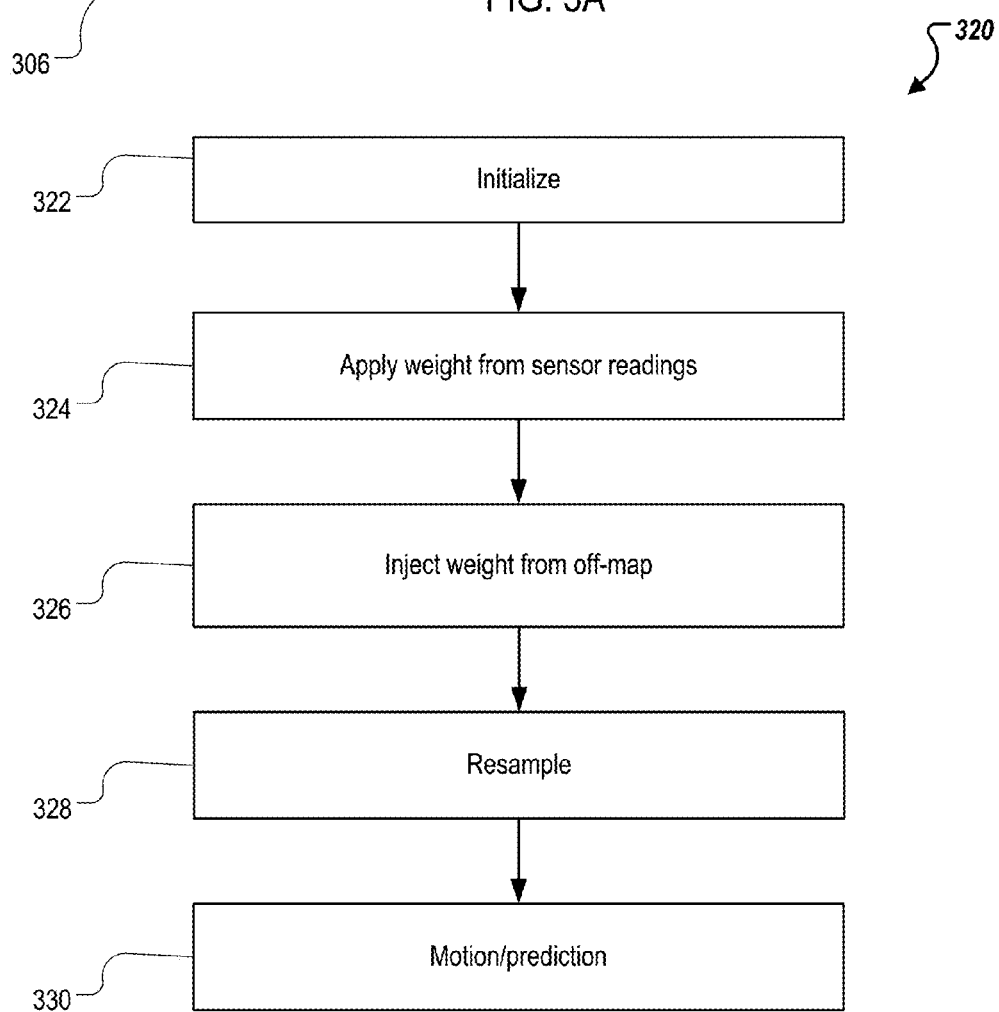
FIG. 3B is a flowchart illustrating an exemplary process of indoor location determination using a particle filter.

FIG. 3B is a flowchart illustrating an exemplary process 320 for indoor location determination using a particle filter, e.g., filter 302 of FIG. 3A. Process 320 can be performed by a mobile device, e.g., mobile device 102 of FIG. 1.

The mobile device can initialize (322) a state space of the particle filter. Initializing the state space can include setting zero particles and one hundred percent off-map weight. Setting one hundred percent off-map weight can include assigning all weight to off-map particles. Off-map particles can include particles that may not be related to a venue.

The mobile device can apply (324) weight from signal measurements. Applying weight from the signal measurements can include determining signal attenuation based on signal propagation characteristics. The mobile device can determine that, in open space, signal strengths obey log normal distribution. The mobile device can determine that, in multi-path plus line-of-sight environment, signal strength may obey a Rician distribution. The mobile device can determine that, in absence of line-of sight, multi-path attenuation converges towards two independent Gaussian distributions including in-phase and quadrature, which yields a Rayleigh distribution for signal strength as measured in Volts (V) or millivolts (mV).

The mobile device can obtain, from location fingerprint data already downloaded to the mobile device, heat maps on what the RSSI is expected to be at each location of a venue. Each heat map can correspond to a different signal source. For each particle, the mobile device can determine a center of a Rayleigh distribution by the expected signal strength according to the heat map. The mobile device can determine that an observed measurement is probable for particles in one or more cells of a grid and improbable for particles in one or more other cells. The mobile device can repeat the above operations for each signal source. In areas where expected signal strength is unavailable, the mobile device can determine the measurement likelihood distribution is a uniform distribution as measured in dBm.

The mobile device then resamples (328) and performs motion and prediction (330), and repeats the operations of stages 324, 326, 328 and 330. Details of the operations of motion and prediction are described below in reference to FIGS. 4A-4F.

FIGS. 4A-4F illustrate various exemplary models for location prediction. FIG. 4A illustrates a motion and prediction in a simplest version. The mobile device can add Gaussian random noise to each particle with a fixed variance per unit time. Particle 402, represented as a solid dot in FIG. 4A, is a particle at time t0. Particles 404, each represented as a circle, are particles at time t1, which is a unit time after time t0. The mobile device can then filter the particles 404 using an observation.

FIG. 4B illustrates a motion and prediction where a mobile device has pedometry information indicating that a user of the mobile device is walking. The mobile device can add small Gaussian random noise where a Laplacian is set at stride length. Particle 406 is a particle at time t0. Particles 408 are particles at time t1.

FIG. 4C illustrates a motion and prediction where a mobile device has pedometry information indicating that a user of the mobile device is not walking. The mobile device can add small Gaussian random noise to each particle with a fixed variance per unit time. Particle 410 is a particle at time to. Particles 412 are particles at time t1.

FIG. 4D illustrates a motion and prediction where a mobile device has pedometry information and in addition, heading information. The heading information can indicate a heading of the mobile device at time t0. The mobile device may not have specific information on whether a user of the mobile device is walking or is stationary. The mobile device can add Gaussian random noise to each particle with a fixed variance per unit time, as well as distributed heading change. Particle 414 is a particle at time t0. Particle 414 is associated with a heading, represented in FIG. 4D as an arrow. Particles 416, each represented by an arrow indicating a respective heading, are particles at time t1.

FIG. 4E illustrates a motion and prediction where a mobile device has pedometry information and heading information. The pedometry information can indicate that the mobile device is being carried by a user who is walking at time t0. The mobile device can add truncated Gaussian random noise to each particle with a fixed variance per unit time, as well as distributed heading change. The mobile device can truncate Gaussian random noise in the heading of the mobile device. Particle 416 is a particle at time t0. Particles 418 are associated with a heading, represented in FIG. 4D as an arrow. Particles 420 are particles at time t1.

FIG. 4F illustrates a motion and prediction where a mobile device has pedometry information and heading information. The pedometry information can indicate that the mobile device is stationary at time t0. The mobile device can add small Gaussian random noise to each particle with a fixed variance per unit time, as well as a fixed heading that corresponds to the heading of the mobile device at time t0. Particle 422 is a particle at time t0. Particles 424 are particles at time t1.

Exemplary Location Survey

Figure 5A:
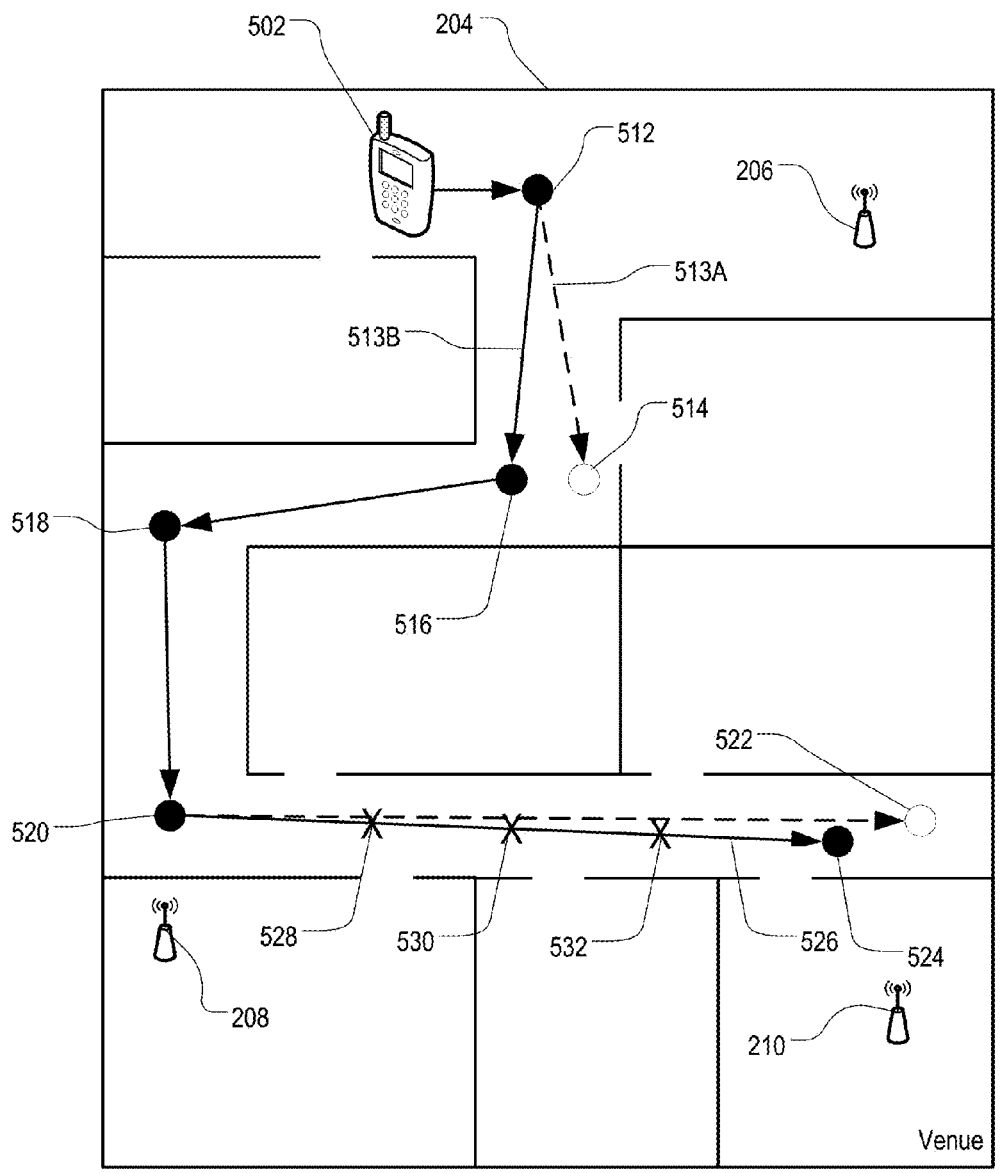
FIG. 5A is a diagram illustrating exemplary indoor survey techniques.

FIG. 5A is a diagram illustrating exemplary indoor location survey techniques. The location survey generates survey data that can be processed to create a location fingerprint for a venue, e.g., venue 204. Sampling device 502 can be a mobile device implementing features of location survey. Sampling device 502 can be carried by a surveyor at venue 204. The surveyor can be a human or a vehicle programmed to move around at venue 204.

Venue 204 can be a space having a structure that has finer structural granularity than available granularity of GPS or WiFi™ triangulation. The structure of venue 204 can include one or more constraints limiting a person's movement in the space. These constraints can include, for example, map constraints (e.g., walls, railings, or cubicle separators), pathway constraints (e.g., a pedestrian walking on a pathway defined by road signs tends to follow the pathway), or pedestrian motion constraints (e.g., a pedestrian cannot move faster than X miles per hour, or move vertically when not in a stairway or elevator).

Surveying venue 204 can include recording environmental readings at venue 204 while sampling device 502 moves in venue 204. The environmental readings can measurements of signals from signal sources (e.g., signal sources 206, 208, and 210) at various locations (e.g., locations 512 and 516) at venue 204. Measuring the signals from signal sources 206, 208, and 210 can include performing a channel scan at locations 512 and 516. The channel scan can be a scan of all standard RF channels of signal sources 206, 208, and 210. If a signal is detected in a channel scan, sampling device 502 can measure one or more aspects of the signal. For example, sampling device 502 can measure an RSSI or an RTT or both. Sampling device 502 can record the measurements in association with an identifier of each of signal sources 206, 208, and 210. The identifier can be a media access control (MAC) address or a service set identification (SSID) of the respective signal source.

Sampling device 502 can start taking measurements at an arbitrary location, e.g., location 512. A surveyor carrying sampling device 502 can walk in any direction following any path. A motion sensor, e.g., an accelerometer, can measure acceleration caused by walking steps of the surveyor. Sampling device 502 can use the measurement, in association with a gyroscope or magnetometer of sampling device 502, to determine a travel speed, travel distance, and bearing. Sampling device 502 can then determine a motion path, e.g., motion path 513A. Motion path 513A can be a path linking two anchors. Each anchor can be a place in venue 204 where a user designates with a marker on sampling device, or a place in venue 204 where sample device determines that a changing of direction has occurred.

For example, a first anchor can be associated with location 512, which is a place designated as a starting point for the survey by the user. A second anchor can be associated with location 514, which is an estimated location of sampling device 502, as determined from the motion sensor and compass readings. Motion path 513A links the starting point and the estimated location.

The anchor associated with estimated location 514 can be moved in response to a user input. The surveyor may have a larger or smaller stride than an average person has. The compass of the sampling device 502 may be affected by various interferences. Accordingly, the estimated location 514 may be an inaccurate location of sampling device 502. The surveyor may correct the inaccuracy by indicating that sampling device 502 is located at location 516. Sampling device 502 can then adjust motion path 513A to motion path 513B. Sampling device 502 can make the adjustment during the survey, e.g., while sampling device 502 moves in venue 204, or after the survey.

Sampling device 502 can move to next locations 518, 520, and 522. Each of next locations 518, 520, and 522 can be an estimated location. Sampling device 502 can receive a user input to adjust estimated location 522 to location 524.

Sampling device 502 can tag environmental readings with waypoints along a motion path. For example, sampling device 502 can determine that traveling from location 520 to location 524 took 20 seconds along adjusted motion path 526, which is 28 meters long. During the 40 seconds, sampling device 502 recorded three sets of environmental readings, at 5th, 10th, and 15th seconds, respectively. Sampling device 502 can determine waypoints 528, 530, and 532 at the 7, 14, and 21 meters from location 520, respectively. Sampling device 502 can associate the locations of waypoints 528, 530, and 532 with the three sets of environmental readings. Sampling device 502, or a location server coupled to sampling device wirelessly, can determine expected environmental readings by a user device if the user device is located at waypoints 528, 530, and 532. The expected readings can be designated as a portion of a location fingerprint of venue 204. The user device can use the location fingerprint of venue 204 to estimate where the user device is located in venue 204.

Figure 5B:
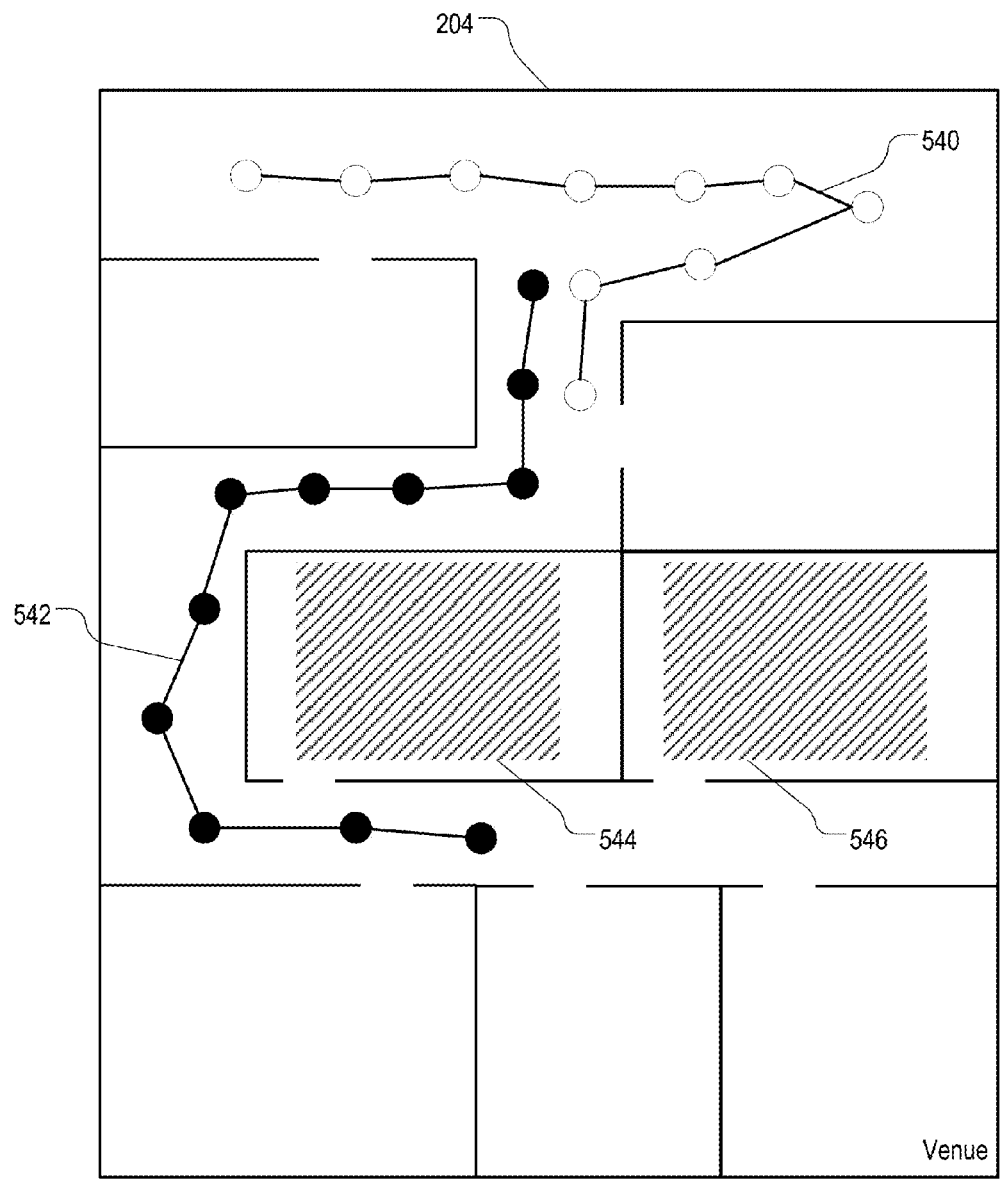
FIG. 5B is a diagram illustrating exemplary aggregation of indoor survey data.

FIG. 5B is a diagram illustrating exemplary aggregation of indoor survey data. A location server can receive survey data from a first sampling device and a second sampling device, both surveyed venue 204. The first sampling device may have followed path 540 during a first survey. The second sampling device may have followed path 542 during a second survey. Path 540 and path 542 may have overlaps, and may have sections that are different from one another.

The location server can determine a respective location in venue 204 where each signal scan occurred. The server can then perform spatial quantization and determine a best fit Rayleigh for the discrete signal scans. In spatial quantization, the location server can determine a grid, including cell size for each cell in the grid. The location server can determine the cell size dynamically. In determining the cell size, the location server can use amount of survey data. More survey data can generally correspond to smaller cell size by bringing in more precision. There may be a critical point where additional data is repetitive rather than adding precision to the survey. Upon determining that adding survey data shrinks the cell size, the location server can determine that more survey will result in more accurate location determination by mobile devices. The location server can request additional survey data from sampling devices. Upon determining that adding survey does not shrink the cell size, the location server can determine that surveys have converged, and that more survey will not result in more accurate location determination by mobile devices. The location server can then notify sampling devices that sufficient survey has been performed. The notification can serve as a reminder to the surveyor to stop surveying a venue. The location server can use the size of the cells as a predictor of a texture of venue 204, which is a lower-bound on location determination accuracy using scanned signals. The best fit Rayleigh can be a continuous probability distribution derived from discrete scans. The Rayleigh can have a unit that is a ratio between measured power and a unit reference power, e.g., dBm. A respective best fit Rayleigh can be associated with each cell.

The system can interpolate and extrapolate unobserved areas of venue 204. For example, the location server can determine that no sampling device has surveyed area 544, which is located between two or more surveyed areas. The location server can then interpolate expected signal measurements by interpolating survey data for the two or more surveyed areas. The location can determine that no sampling device has surveyed area 546, which is not between two or more surveyed areas. The location server can then interpolate expected signal measurements by extrapolating survey data of surveyed area using signal propagation characteristics, e.g., log-distance path-loss, log normal distribution, or Rician distribution and structure of venue 204. The interpolation and extrapolation can include simplifying log distance path loss into purely linear equations, reducing the interpolation or extrapolation into an instance of Discrete Poisson Equation (DPE). The location server can compute result using a DPE solver.

The location server can determine a dimension of floor plan of venue 204. Determining the dimension includes determining a reference for which direction is North. This determination allows location determination to use a compass as a heading reference. The location server can determine a local magnetic north by taking a median of compass readings in the survey data. The local magnetic north may or may not be the same as actual magnetic north due to environmental effects.

Determining the dimension can include determining measurements on the floor plan, e.g., in unit of meters. If latitude and longitude anchors are available for the floor plan, the location server can calculate a conversion. Determining the measurements can be based on surveyor provided reference points. If latitude and longitude anchors are unavailable for the floor plan, the location server can calculate size of the floor plan using walking distance.

The location server can perform the operations for each signal source into a respective heat map. The location server can provide the heat maps as location fingerprint data to mobile devices, e.g., mobile device 102, for location determination.

Figure 6:
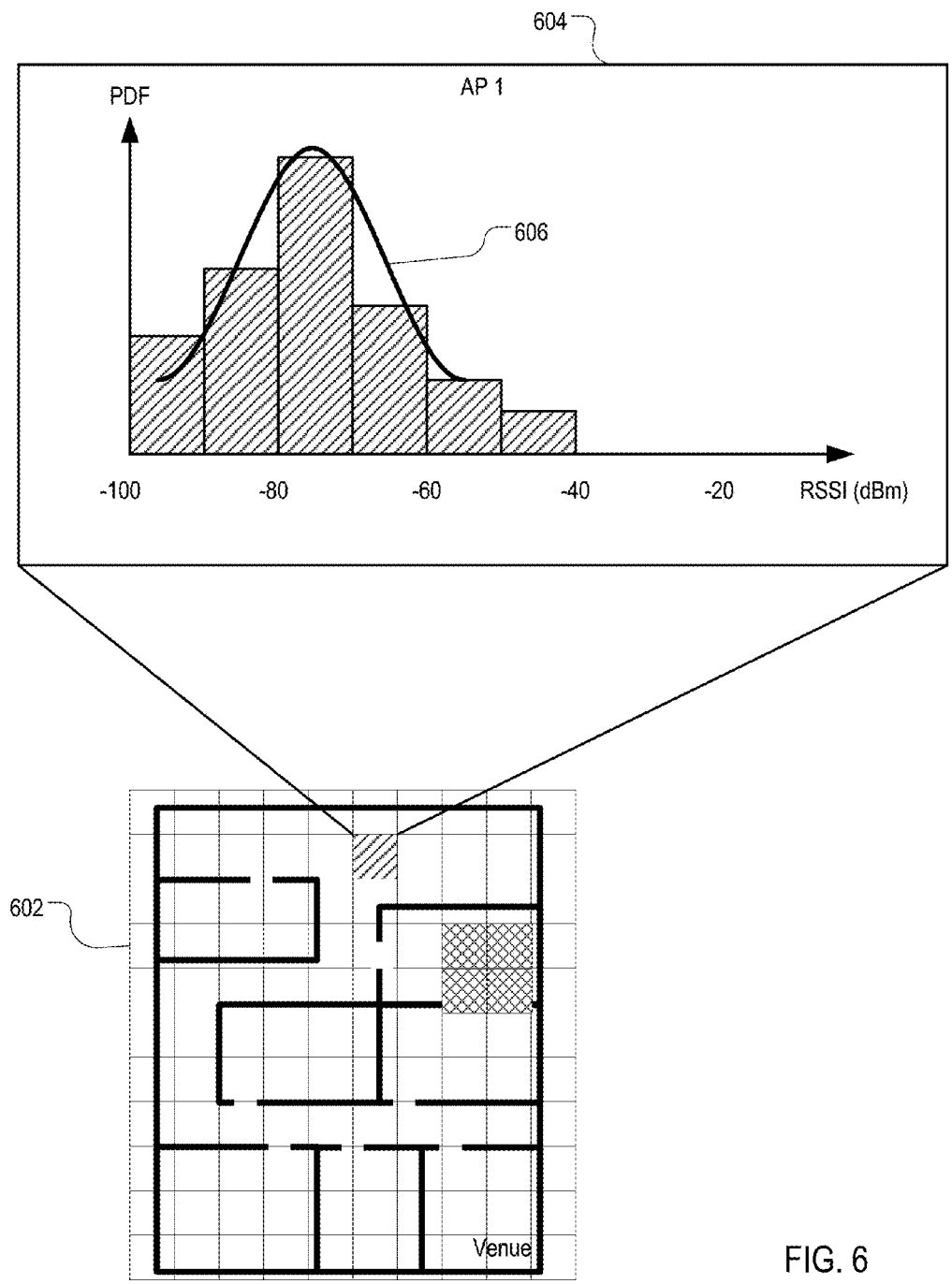
FIG. 6 is a diagram illustrating exemplary location fingerprint data for a cell.

FIG. 6 is a diagram illustrating exemplary location fingerprint data for a cell. The location fingerprint data include heat map 602 of venue 204 (of FIG. 2). Heat map 602 can include virtual cells overlaid on a map of venue 204. Each cell is associated with an expected measurement of a signal if the measurement is taken in that cell.

A representative cell 604 is provided for illustration. Cell 604 can be associated with probability density function 606. The probability density function can be a Rayleigh fit for sampling data over RSSI. The sampling data can include a count of measurements taken at a location in venue 204 corresponding to cell 604 for each of multiple ranges of RSSI, e.g., −100 dBm to −90 dBm, −90 dBm to −80 dBm, and so on. The expected value can be a statistical expectation of the Rayleigh fit.

Figure 7:
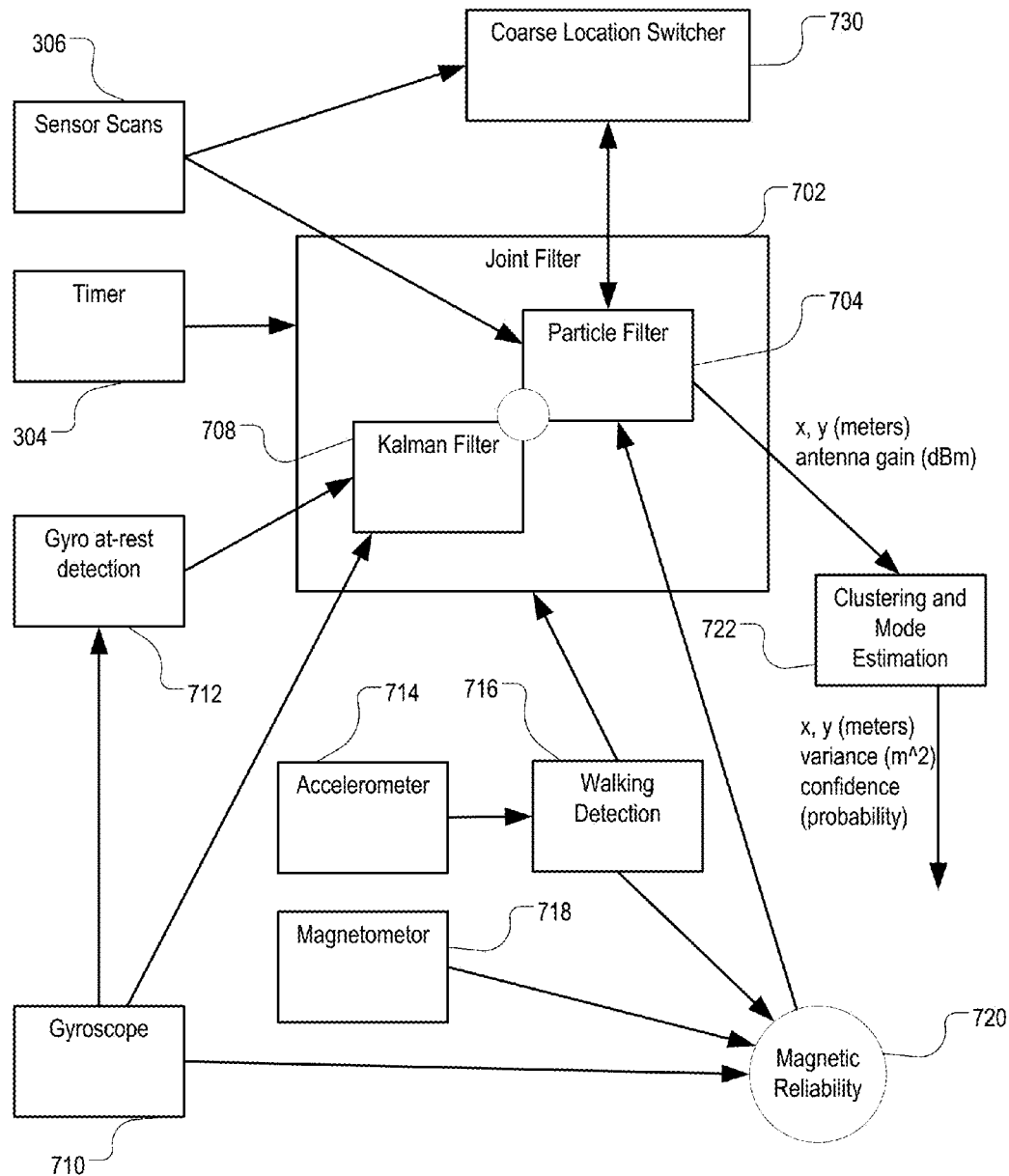
FIG. 7 is a block diagram illustrating an exemplary architecture of indoor location determination.

FIG. 7 is a block diagram illustrating an exemplary architecture of indoor location determination. The architecture can be implemented on a mobile device, e.g., mobile device 102 (of FIG. 1).

Mobile device 102 can feed output of timer 304 and sensor scan 306 to joint filter 702. Sensor scans 306 can include RF signal measurements. Joint filter 702 can include two Bayesian filters, first filter 704 and second filter 708, working in conjunction. First filter 704 can be a type of particle filter configured to filter particles, e.g., candidate locations of mobile device 102 in a venue, using observations, e.g., sensor scans 306. A candidate location is a possible location of mobile device 102 in an iteration of the particle filter. Second filter 706 can be a type of Kalman filter configured to process inertial sensor readings and magnetometer readings. Output of timer 304 can define time intervals for first filter 704 and second filter 706. The time intervals for first filter 704 and second filter 706 can be same as or different from one another. Particle filter 704 can analyze "self-fit" statistic of particle filter 704 that indicates a degree of confidence. If the mostly recent indoor location only weakly agrees with the recent measurements, particle filter 704 can determine a low confidence value.

The mobile device 102 can include gyroscope 710 configured to measure angular velocity and acceleration around x, y, and z axes. A gyro at-rest detection module 712 of the mobile device 102 can determine, based on output of gyroscope 710, whether the mobile device is a gyro-at-rest mode. The joint filter 702 can filter readings of gyroscope 710 using output of gyro at-rest detection module 712 to infer heading of mobile device 102, velocity of mobile device 102 along that heading, and a bias of gyroscope 710.

The mobile device 102 can include accelerometer 714 configured to measure linear acceleration of the mobile device in the direction of x, y, and z axes. Accelerometer 714 can generate pedometry data. A walking detection module 716 can determine, using the pedometry data, whether the mobile device is in a walking mode in which the device is carried by a walking user, in an unspecified mode in which the mobile device may move, e.g., being pulled out of pocket but not in a walking mode, or is in an at-rest mode.

The mobile device 102 can include magnetometer 718 configured to determine a magnetic North. A magnetic reliability module 720 can determine, using output from gyroscope 710 and output from walking detection module 716, magnetic reliability at any given time. The magnetic reliability module 720 can filter out readings of magnetometer 718 that may be inaccurate, e.g., as caused by a magnetic object located close to the mobile device, by magnetometer lag, or by magnetometer noise.

Joint filter 702 can determine a probability distribution of state of the mobile device using output of the gyro at-rest detection module 712, gyroscope 710, walking detection module 716, and magnetic reliability module 720. The probability distribution can include probability distribution on an x, y location, e.g., in meters, and an antenna gain, e.g., in dBm, and feed the probability distribution to a clustering and mode estimation module 722. Clustering and mode estimation module 722 can determine an estimated location of the mobile device from the probability distribution in meters, a variance of the estimated location in meters squared, and a confidence associated with the estimated location expressed in a probability value.

Mobile device 102 can include coarse location switcher 730. Coarse location switcher 730 is a component of mobile device 102 configured to detect a transition of mobile device 102. A transition can include exiting a venue by mobile device 102 or moving of mobile device 102 from a first portion of a venue, e.g., a first floor of a building, to a second portion of the venue, e.g., the second floor of the building. Upon detecting the transition, coarse location switcher 730 can switch to a different portion of location fingerprint data, switch from indoor location determination to outdoor location determination, e.g., by using GPS signals, or both.

Coarse location switcher 730 can determine a probability that mobile device 102 is in the venue using various signals, e.g., Wi-Fi signals or GPS signals. For example, coarse location switcher 730 can analyze a recent collection of scans (e.g. the most recent scan on each channel, anytime in the last 90 seconds) and list all the MAC addresses observed. If mobile device 102 is not in a venue V, coarse location switcher 730 may not observer many of the MAC addresses that coarse location switcher 730 is expected to observer if mobile device 102 is inside venue V. Similarly, if mobile device 102 is actually inside venue V, coarse location switcher 730 is likely to observer many of the MAC addresses of this venue in every single scan.

Other inputs to coarse location switcher 730 can include taking recent locations, e.g., GPS locations, and comparing the latitude and longitude of the resent locations to known latitude and longitude of venue V. The further apart they are, the less likely mobile device 102 is located at venue V. Likewise, when mobile device 102 is indoors, it is harder to get a strong satellite fix for mobile device 102. Upon observing weak or nonexistent satellite fixes, coarse location switcher 730 can determine that that mobile device 102 is likely to be indoors. Upon observing strong satellite fixes that are far outside the venue, coarse location switcher 730 can determine that mobile device 102 probably is not located at venue V.

Altogether, the recent collection of scans, the recent locations, and the confidence value can form a Bayesian filter. Each of the three sources votes on whether it believes mobile device 102 is in each particular venue. For each venue, the votes are tallied. In some implementations, these votes are treated as probabilities and the tallying is replaced with a proper Bayesian filter. A simpler and resource-wise cheaper algorithm might simply count votes instead, but for the simpler algorithm, to determine how many votes are worth how much may be harder.

Figure 8:
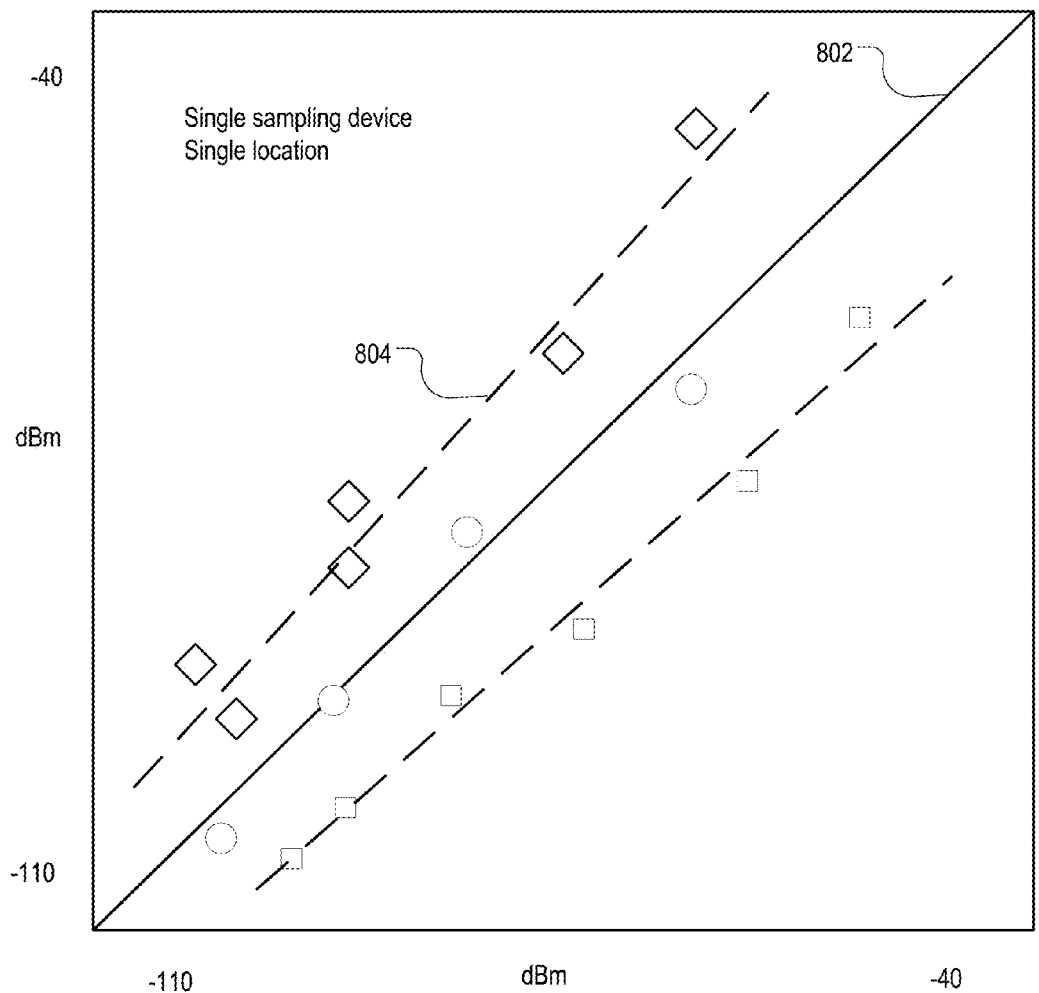
FIG. 8 is a diagram illustrating different antenna gains in exemplary indoor location determination.

FIG. 8 is a diagram illustrating different antenna gains in exemplary indoor location determination. Different makes and models of sampling devices and different makes and models of other mobile device may have different antenna gains. A same mobile device may have different antenna gains when held by a user at different positions and different angles. A location subsystem can add antenna gain to state of the first filter 704 (of FIG. 7) to compensate.

For example, a mobile device may have a first gain pattern 802 at a location. The mobile device may have a second gain pattern 804 due to environmental effects, e.g., as caused by a room being crowded, or by ways of the mobile device being held. A second mobile device may have a third gain pattern 806, which may be caused by a different design in antenna and chipset. The location subsystem can infer a separate antenna gain, measured in dBm. A horizontal axis X can indicate a signal strength expected to be observed by a mobile device when the mobile device is in a different position or angle. A vertical axis Y can indicate signal strength actually observed by the mobile device. Corresponding to the first gain pattern 802, the location subsystem can introduce the dBm parameter y=x+g0, where g0=0. Corresponding to the second gain pattern 804, the location subsystem can introduce the dBm parameter y=x+g1. Corresponding to the second gain pattern 804, the location subsystem can introduce the dBm parameter y=x+g2. In the calculations above, g0, g1, and g2 are different antenna gains measured in dBm.

Figure 9A:
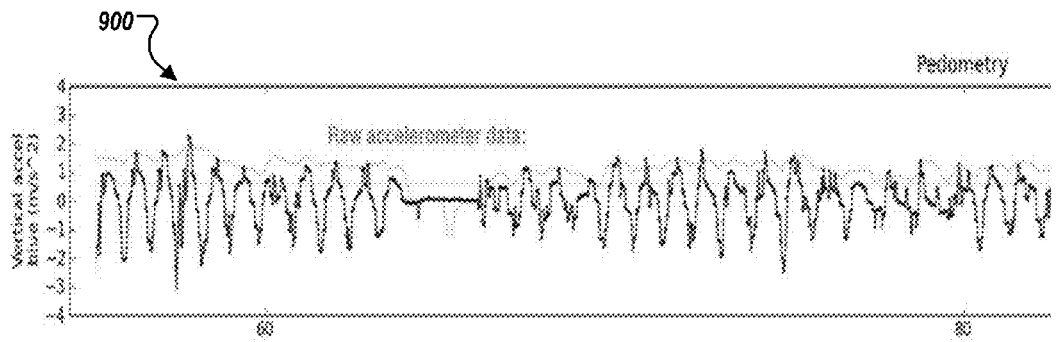
FIG. 9A illustrates exemplary pedometry data of a device configured for indoor location determination.

FIG. 9A illustrates exemplary pedometry data 900 of the device configured for indoor location determination. Pedometry data 900 can include readings from accelerometer 714 (of FIG. 7). The readings are represented in a two dimensional graph. An X axis of the graph represents time as measured in seconds. A Y axis of the graph can represent vertical acceleration as measured in meter per second per second (m/s^2). Each peak and trough in pedometry data 900 can represent on step a person who carries a mobile device takes. Sections of pedometry data 900 may be flat, indicating that the person is not walking during the time of that section.

Figure 9B:
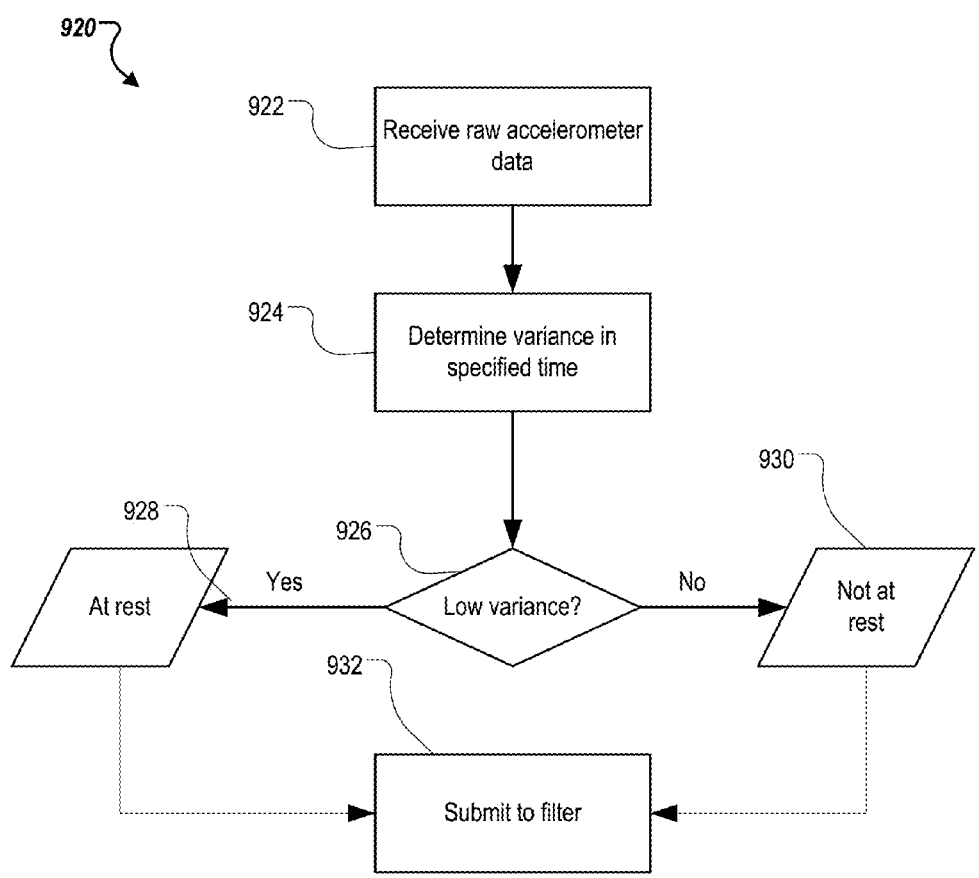
FIG. 9B is a flowchart illustrating an exemplary process of accelerometer heuristics.

FIG. 9B is a flowchart illustrating an exemplary process 920 of accelerometer heuristics. Process 920 can be performed by walking detection module 716 of FIG. 7.

Walking detection module 716 can receive (922) pedometry data 900 from accelerometer 714. Walking detection module 716 can determine (924) a variance in acceleration in a specified time. The time can be specified to be an average time for a human to take a step, e.g., 750 milliseconds (ms). Walking detection module 716 can determine whether the variance falls below a threshold. If yes, e.g., when the variance is sufficiently low, walking detection module 716 can determine that the mobile device is in at-rest mode 928. If no, e.g., when the variance is sufficiently high, walking detection module 716 can determine that the mobile device is in not at rest mode 930.

Upon determining that the mobile device is in not at rest mode 930, walking detection module 716 can determine whether the mobile device is in an unspecified mode or in a walking mode using magnitude of the acceleration to gravity and step duration check. For example, if the variance indicates a change of direction of acceleration is above or below a normal step time, e.g., above K ms or below L ms, walking detection module 716 can determine that the mobile device is in an unspecified mode. Otherwise, walking detection module 716 can determine that the mobile device is in a walking mode. Walking detection module 716 can submit (932) at-rest mode 928, the unspecified mode, or the walking mode to joint filter 702 and magnetic reliability module 720 (both of FIG. 7) as output.

Likewise, gyroscope at-rest detection module 712 can determine if the mobile device is in gyroscope at rest mode or gyroscope not at rest mode based on variance of gyroscope readings during a specified time. The specified time can correspond to a time for changing walking direction, e.g., 1.5 seconds. Upon determining that the variance exceeds a threshold, gyroscope at-rest detection module 712 can determine that the mobile device is in a gyroscope not at rest mode. Otherwise, gyroscope at-rest detection module 712 can determine that the mobile device is in a gyroscope not at rest mode.

Exemplary Joint Filters

Figure 10A:
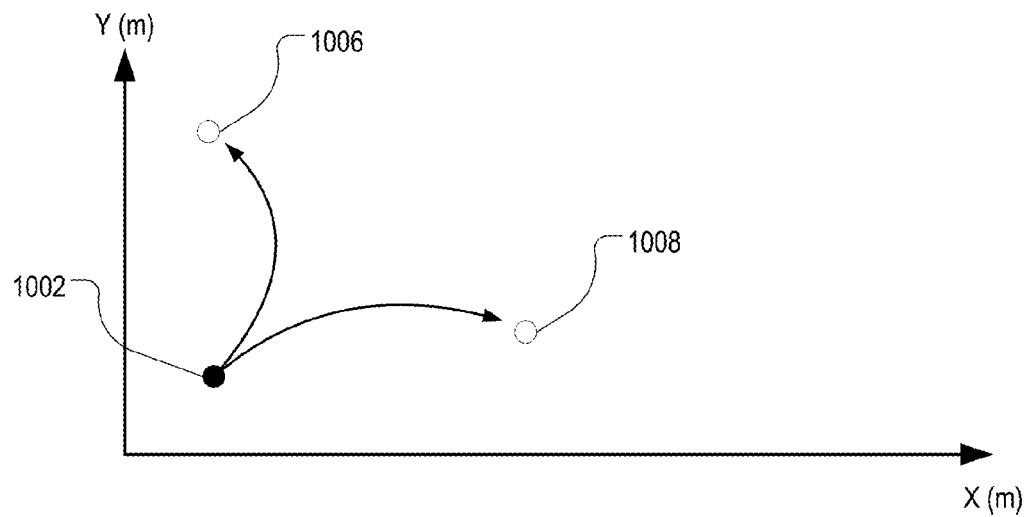
FIGS. 10A and 10B illustrate exemplary data for two different filters.
Figure 10B:
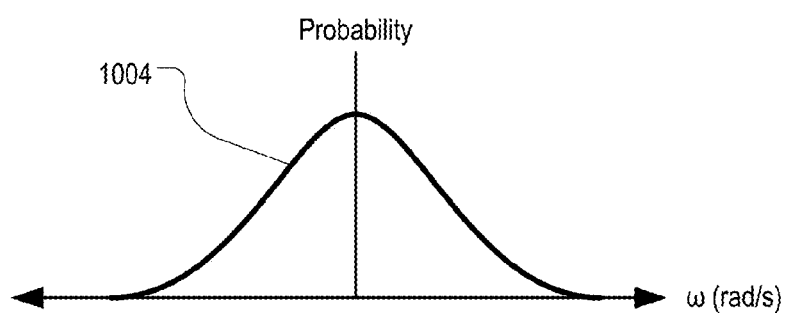

FIGS. 10A and 10B illustrate exemplary data for two different filters. The two filters can be first filter 704 and second filter 708 of FIG. 7. The first filter 704, e.g., a particle filter, and the second filter 708, can be combined without cascading. Particle 1002 can correspond to a possible location of a mobile device at a (x0, y0) position at time t0. Meanwhile, at time between t0 and t1, a gyroscope can detect a change of direction of the mobile device, the change of direction having a probability distribution 1004. A location subsystem of the mobile device can combine the particle 1002 and probability distribution 1004 of changing directions to determine a probability distribution, at time t1, that the mobile device is located at location (x1, y1) corresponding to particle 1006 or at location (x2, y2) corresponding to particle 1008.

Figure 11:
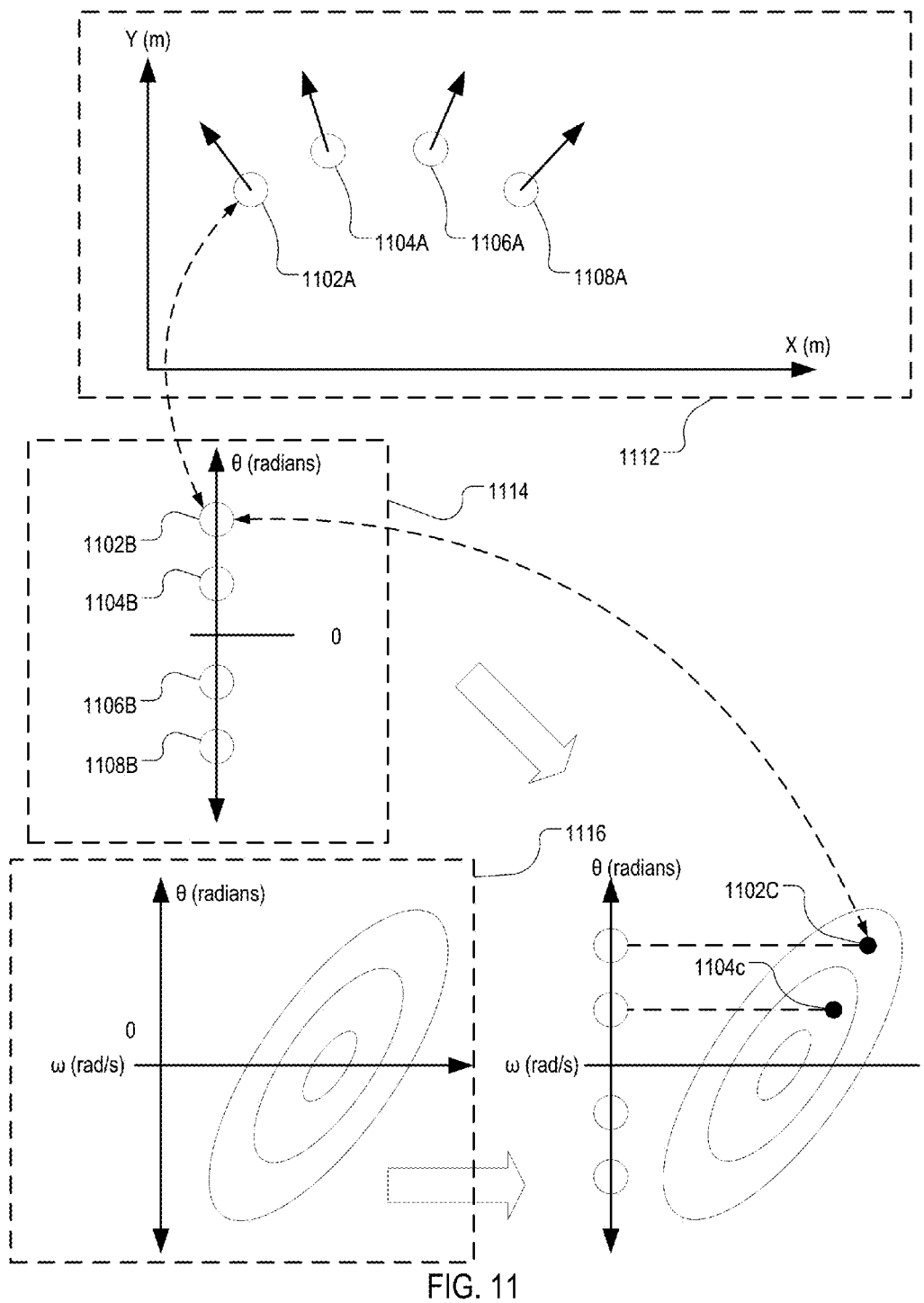
FIG. 11 illustrates inter-relationship between exemplary data for two different filters.

FIG. 11 illustrates inter-relationship between exemplary data for two different filters, e.g., a particle filter and a Kalman filter. The Kalman filter can influence the particle filter through an implied distribution. The particle filter can influence the Kalman filter by inducing weights on a central moment. A location subsystem of a mobile device can perform joint inference, e.g., inferring gyroscope bias using RF signal scans. In addition, the location subsystem can use the RF signal scans to infer heading, angular velocity, and position of the mobile device. If the location subsystem resolves one of the gyroscope bias, heading, angular velocity, or position, the location subsystem can use the solution to resolve another of the variables. The location subsystem can infer hidden parameters of models that govern the Bayesian filters. For example, "stride length" of a user, or the distance of each step, may be unknown a priori. Over time, the location subsystem can determine a dominant stride length that is consistent with the user's overall trajectory. The location subsystem can also learn properties of the magnetic field around the mobile device and other sensor biases.

At given time t0, each particle 1102A, 1104A, 1106A, and 1108A in particle filter 1112 can have a respective x position in meters, a respective y position in meters, and a respective heading θ in radians of a reference direction, e.g., North. The headings of particles 1102A, 1104A, 1106A, and 1108A are represented as heading 1102B, 1104B, 1106B, and 1108B, not to scale, in heading map 1114.

A Kalman filter can have a system state 1116 that includes a probability distribution of rate ω of change of headings, measured as radian per second (rad/s) over heading θ. The location subsystem can link the system state 1116 of the Kalman filter with particles in particle filter 1112 through heading map 1114. Through the link, the location subsystem can give each particle, e.g., particle 1102A and particle 1104A, an implied distribution for ω, e.g., distribution 1102C and distribution 1104C, respectively.

Figure 12:
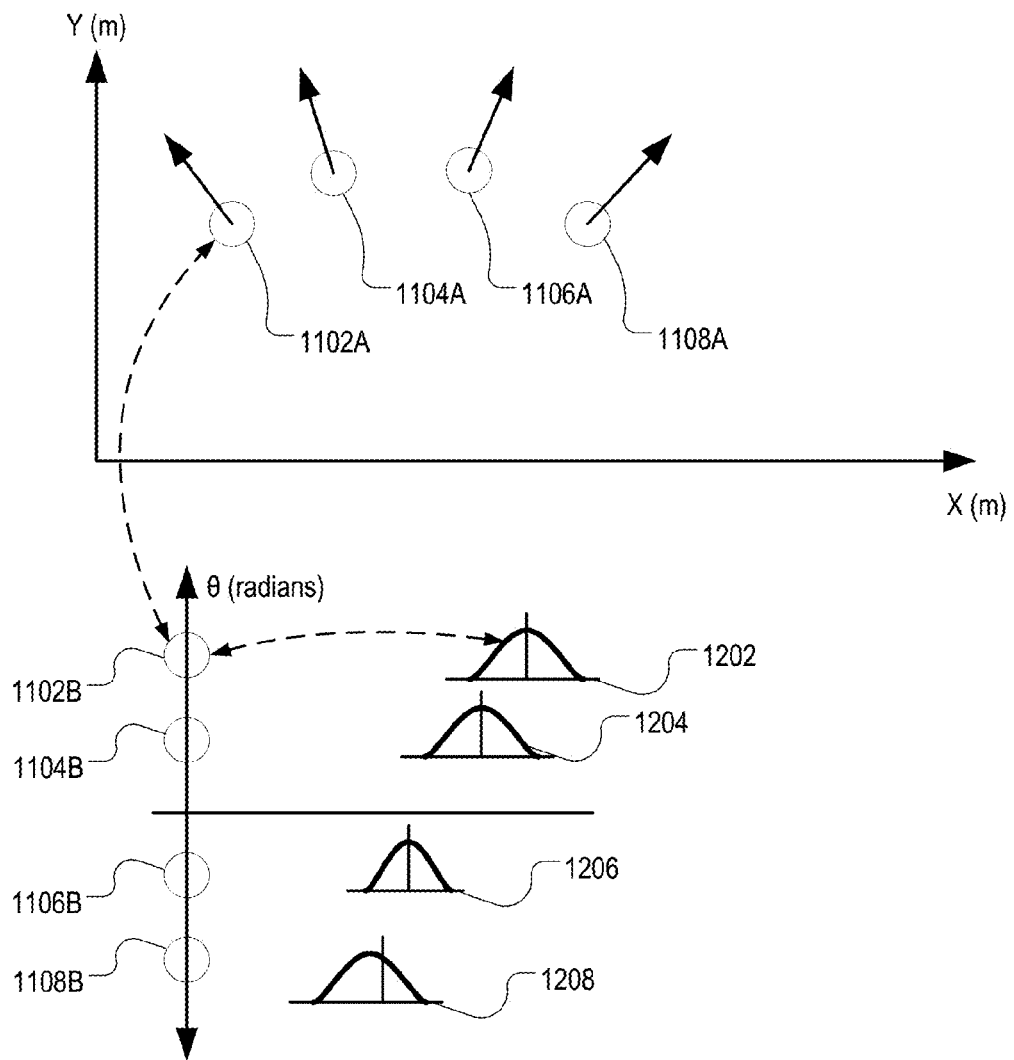
FIG. 12 illustrates exemplary representation of distribution of angular motion.

FIG. 12 illustrates exemplary representation of distribution of angular motion. The location subsystem can represent distribution 1102C and distribution 1104C of FIG. 11 as Gaussians 1202 and 1204, respectively. Thus, the location subsystem can associate particles 1102A and 1104A with Gaussians 1202 and 1204. Likewise, the location subsystem can associate particles 1106A and 1108A with Gaussians 1206 and 1208, respectively.

Figure 13:
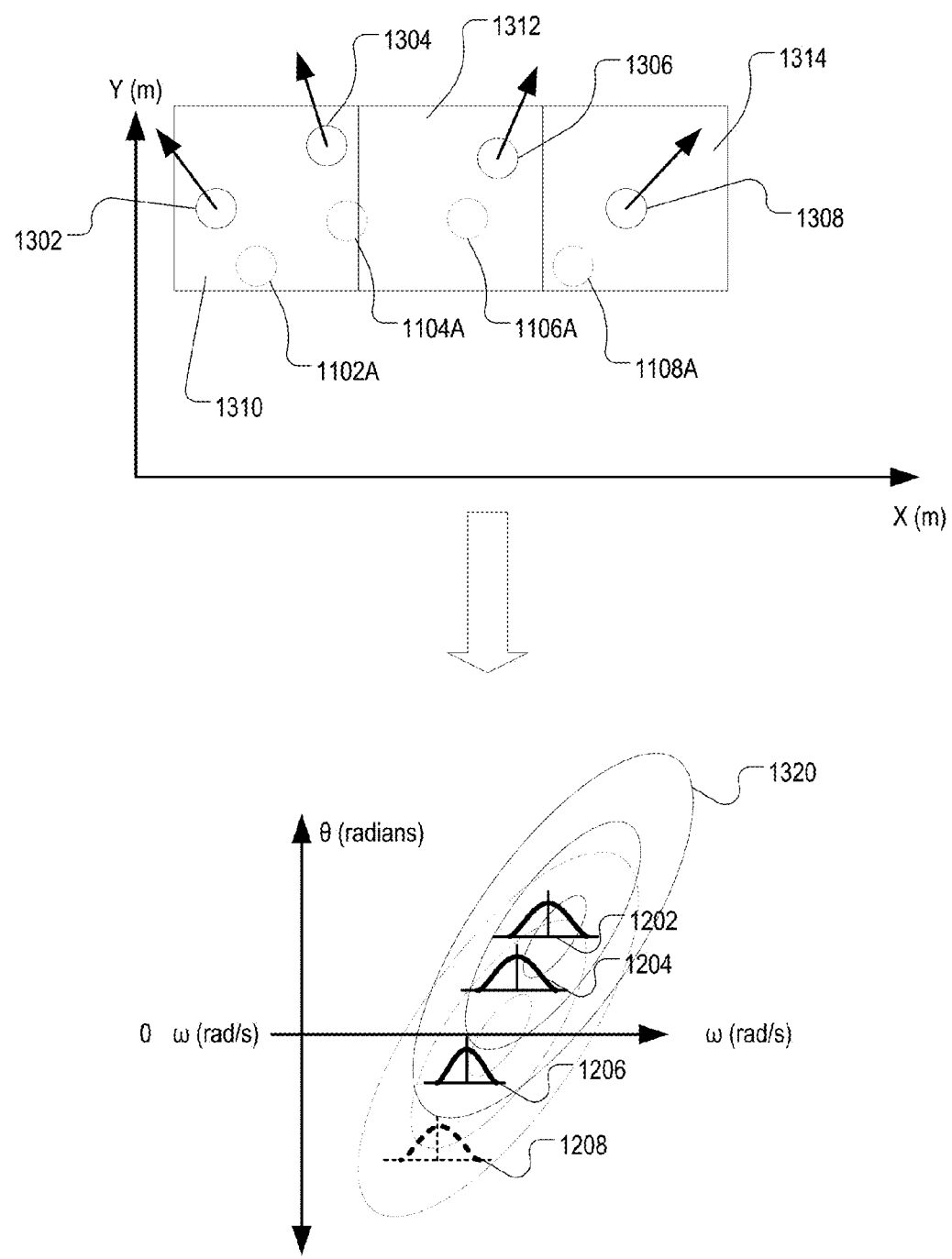
FIG. 13 illustrates exemplary techniques for determining a bias of a sensor for measuring angular velocity and acceleration.

FIG. 13 illustrates interactions between two Bayesian filters. FIGS. 11-12 illustrate implied distribution of rate ω of change of heading θ at t0. FIG. 13 illustrates changes of the distribution at time t1, e.g., one unit of time after t0.

At time t1, particles 1102A, 1104A, 1106A, and 1108A are replaced by particles 1302, 1304, 1306, and 1308. The location subsystem may have received a sensor scan between time t0 and t1. Based on the sensor scan and location fingerprint data, the location subsystem can determine a respective probability that the mobile device is located in cell 1310, 1312, or 1314. For example, the location subsystem can determine that the mobile device is highly likely to be located in cell 1210, likely to be located in cell 1312, and unlikely to be located in cell 1314. The location subsystem can then reweight the particles based on the respective probability. For example, the location subsystem can give particles 1302 and 1304, which are located in cell 1310, the highest weight, give particle 1306, which is located in cell 1312, medium weight, and give particle 1308, which is located in cell 1314, the lowest weight.

The reweighting may change a central moments of the implied distribution of rate ω. For example, the central moments of the implied distribution, originally in proximity to Gaussians 1204 and 1206 at time t0, can be in proximity to Gaussians 1202 and 1204, due to the lowest weight associated with particle 1308 that corresponds to Gaussian 1208. The location subsystem can then determine a Kalman posterior 1320. The location subsystem can use Kalman posterior 1320 and associated probability distribution to reweight the particles.

Location Transition Detection

Figure 14A:
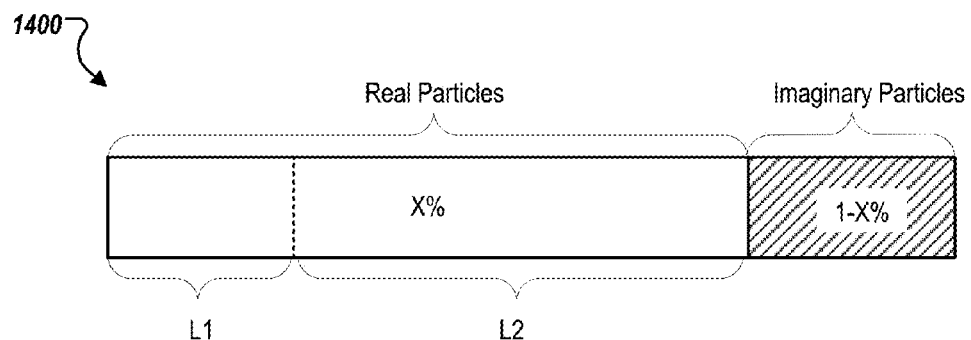
FIGS. 14A and 14B illustrate exemplary techniques for determining a location transition.
Figure 14B:
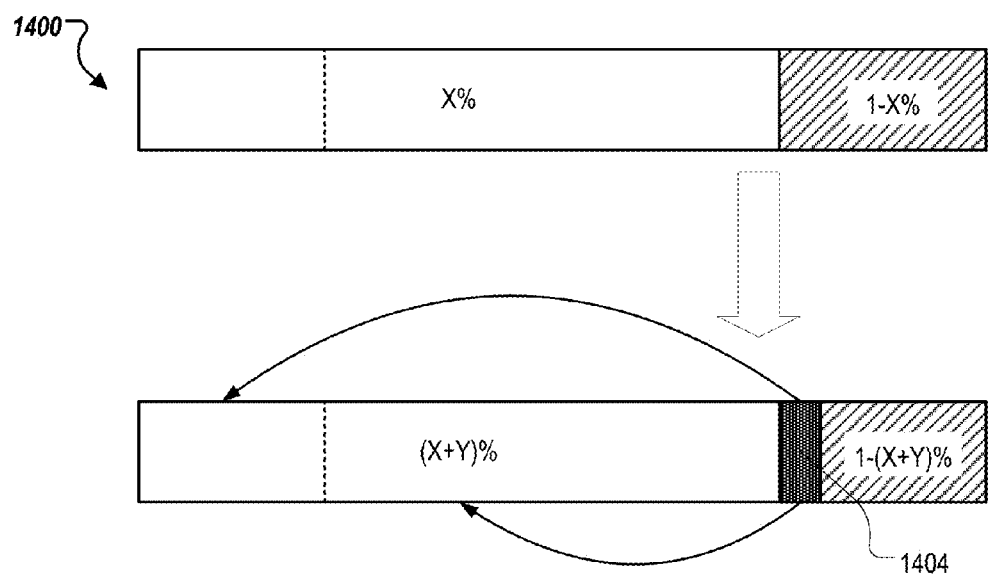

FIGS. 14A and 14B illustrate exemplary techniques for determining a location transition. FIG. 14A illustrates exemplary composition of particles in a particle filter. A location subsystem of mobile device 102 of FIG. 1, when determining a location at a venue, e.g., venue 204 of FIG. 2, can use a particle filter. The location subsystem can designate candidate locations in a first portion venue 204 as a portion of the particles for the particle filter. The location subsystem can designate other locations at a second portion of venue 204, e.g., a different floor of venue 204, as another portion of the particles. In addition, the location subsystem can designate "imaginary particles" that are random locations as a third portion of the particles.

For example, the location subsystem can determine that mobile device 102 is in the first portion of venue 204 by using a coarse location determination operation. Mobile device 102 may store in a location database a list of wireless access point identifiers, e.g., MAC address of the wireless access points. Each MAC address may be associated with a portion of venue 204, e.g., a first floor, a second floor, and so on, where a wireless access point of that MAC address is detectable. The coarse location determination operation can include determining an identifier of a signal source that is detected by mobile device 102 and matching the identifier with an identifier in the location database, and designating the associated portion of the venue as a coarse location of mobile device 102.

The location subsystem can designate N number of (e.g., 500) particles to be used in a particle filter at time to. These particles are represented as particles 1400. Of particles 1400, X percent (e.g., 85%) can be designated as real particles that are locations at the portion of venue 204 or another portion of venue 204, e.g., one floor above venue 204. Of particles 1400, 1-X % (e.g., 15%) of the particles can be imaginary particles. Of the real particles, a first number of particles can be from the other portion of venue 204 designated as L1. A second number of particles can be from the portion of venue 204, designated as L2, in which mobile device 102 is located according to a prior estimation. The location subsystem can use the imaginary particles and the particles at a different location to detect transitions. For example, the location subsystem can infer that mobile device 102 transitioned between a first portion of venue 204 to a second portion of venue 204, or departed from venue 204, using weight of the imaginary particles. When a particle filter indicates that mobile device is more likely to be located at a location corresponding the imaginary particles or the different particles, the location subsystem can determine that mobile device 102 transitioned out of venue 204.

FIG. 14B illustrates exemplary weighting of particles in a particle filter. The location subsystem can move weight 1404 from imaginary particles to real. The location subsystem samples particles at time t0 and resamples the particles at time t1. Resampling can include selecting some particles based on weight, and discarding other particles. Each resample corresponds to an updated search in a most likely area where mobile device 102 is located. The weight to be moved can be Y percent (e.g., 2%, or 0.02). The location subsystem can resample (X+Y) percent (e.g., 87%) weight back to the total. The new weight is distributed across both locations.

Figure 15:
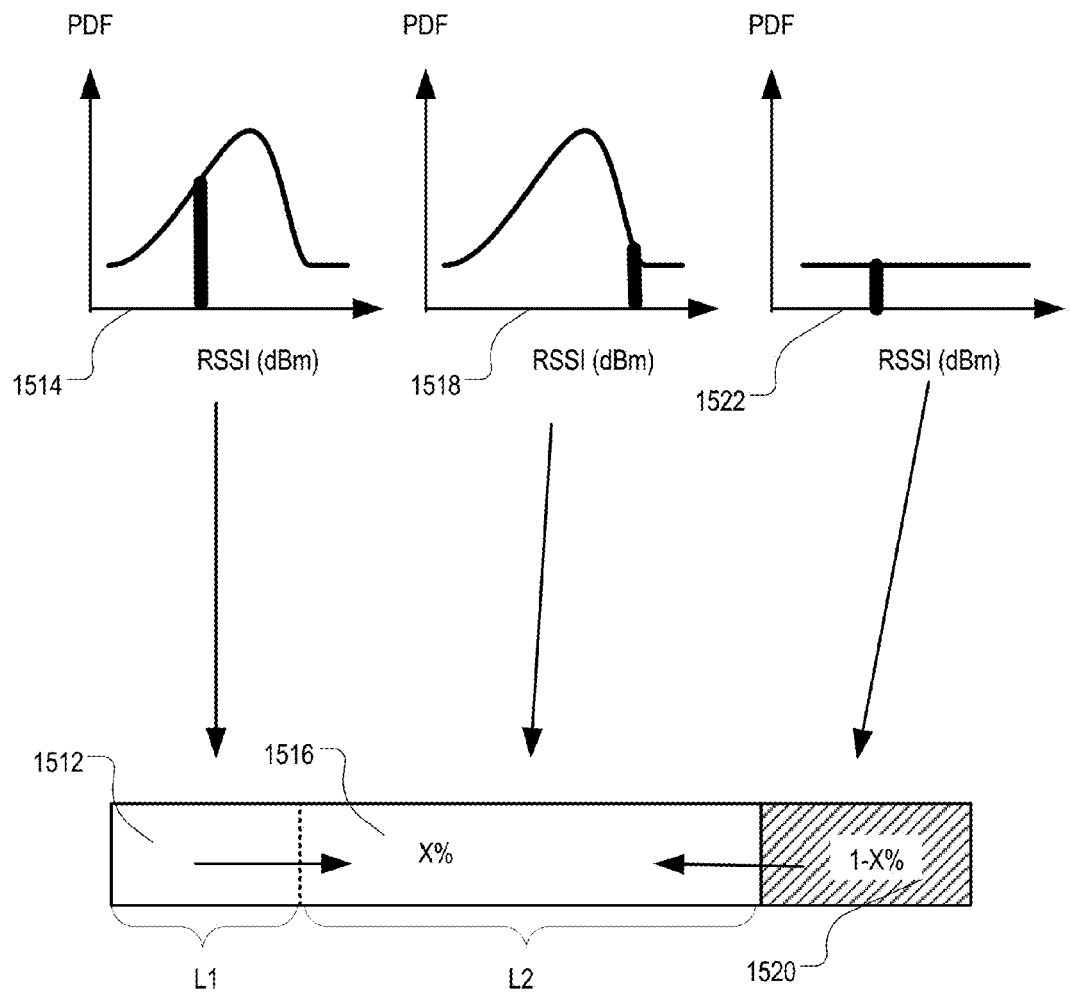
FIG. 15 illustrates exemplary weight shift in determining a location transition.

FIG. 15 illustrates exemplary weight shift in determining a location transition. During measurements, each portion of the particles can be measured against a different prior. For example, mobile device 102 determines that a most likely location of mobile device 102 is at first portion of venue 204. The location subsystem of mobile device 102 can measure the portion of the particles 1512, corresponding to location L1 (a second portion of venue 204), against a first measurement model 1514. The location subsystem of mobile device 102 can measure the portion of the particles 1516, corresponding to location L2 (the first portion of venue 204) against second measurement model 1518. The location subsystem of mobile device 102 can measure the portion of the particles 1520, corresponding to the imaginary particles of an un-surveyed space, against a third measurement model 1522. The third measurement model 1522 can have a uniform distribution.

The different likelihood of the locations can cause particle weight to shift in a next iteration of the particle filter. For example, a higher likelihood that mobile device 102 is located at venue 204 can cause particle weight to shift in favor of venue 204, increasing the weights of particles 1512 and 1516. If the location subsystem determines that the probability that mobile device 102 is located at various portions of venue 204, including location L2, is lower than the probability that mobile device 102 is located at location L1, the location subsystem can search L1 by increasing the weight of particles 1512 corresponding to location L1. The shift allows the location subsystem to dynamically determine whether mobile device 102 transitioned between floors of a building, from indoor to outdoor, or from indoor to outdoor. Mobile device 102 can allow weight of the imaginary particles, and the overall fraction, to vary freely throughout the particle filter's runtime. The fraction can get as low as 0% and reaches 100% sometimes. When the particle filter first starts, it is initialized to 100% imaginary, until some time has passed and some weight is shifted into L1 and L2.

Deduplication

Figure 16:
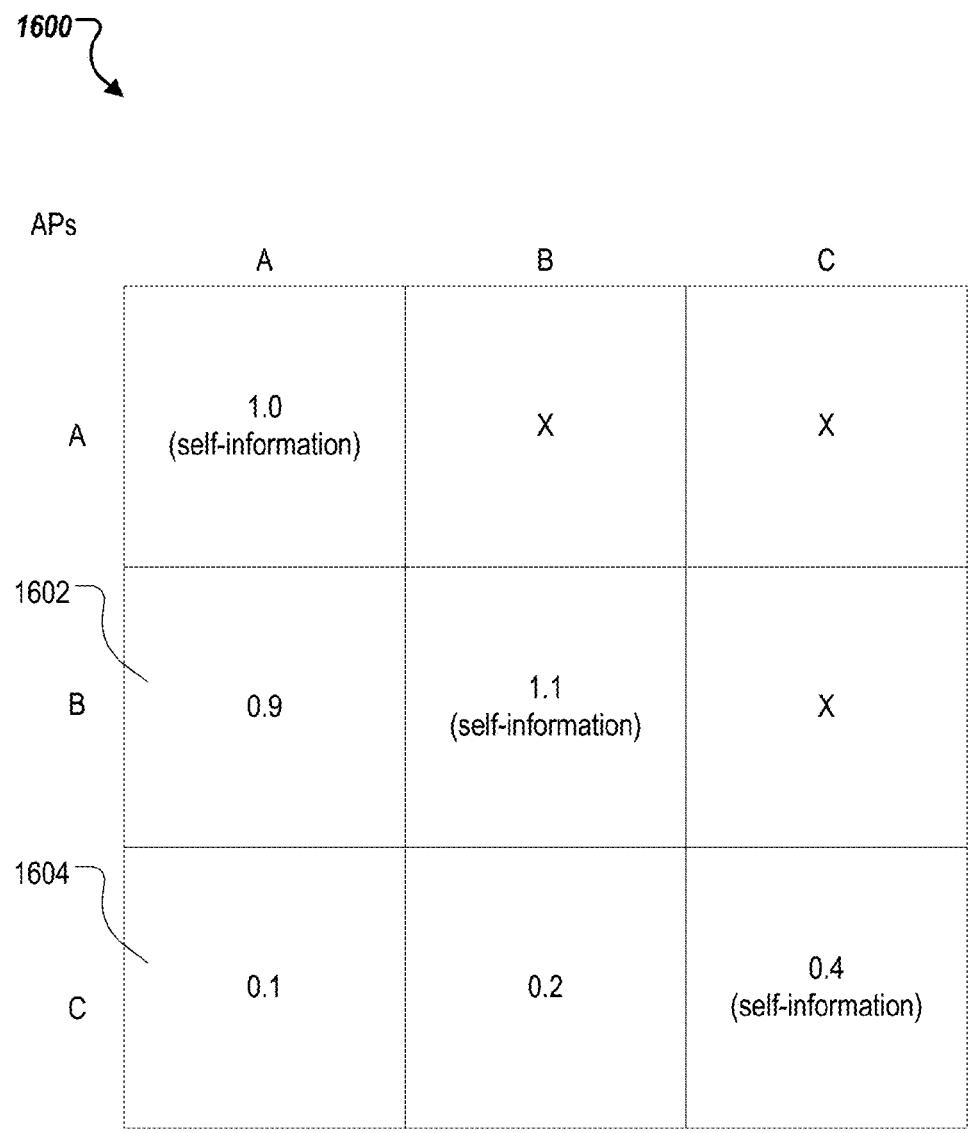
FIG. 16 illustrates an exemplary affinity matrix for de-duplicating survey data.

FIG. 16 illustrates an exemplary affinity matrix for deduplicating survey data. At a venue, signal measurements of two signal sources may be correlated where measurements of a signal from a first signal source depends on measurements of a signal from a second signal source. For example, two wireless access points may be placed next to one another. RSSI measurements and RTT measurements of the two wireless access points can have a linear relationship. A system, e.g., a sampling device, a location server, or mobile device 102 of FIG. 1, can deduplicate strongly correlated signal sources to reduce size of location fingerprint data and computation complexity. The location subsystem can perform the deduplication using an affinity matrix, e.g., exemplary affinity matrix 1600.

For each pair of signal sources detected in a survey, the system can calculate mutual information that measures how much one set of measurements depends on another set of measurements. Calculating mutual information can include converting the measurements to a same unit, e.g., dBm. The system then quantizes the converted measurements, and calculates discrete or continuous mutual information entropy. Higher mutual information entropy between two signal sources can correspond to higher dependency and higher correlation between the two signal sources. The system can store the mutual information entropy in affinity matrix 1600.

Affinity matrix 1600 can include a first dimension corresponding to signal sources, e.g., wireless access points A, B, and C. Affinity matrix 1600 can include a second dimension corresponding to the same signal sources. Each element in affinity matrix 1600 can be a mutual information entropy value between two signal sources. A control value, also designated as self information, can be stored for each wireless access points A, B, and C as elements (A, A), (B, B), and (C, C), respectively. The control value can serve as a system stability check where, in each row, all mutual information entropy values are no higher than the control value. Element 1602 (B, A), having a higher mutual information entropy value than element 1604 (C, A), can indicate that wireless access points B and A have a stronger correlation than a correlation between wireless access points C and A.

Figure 17A:
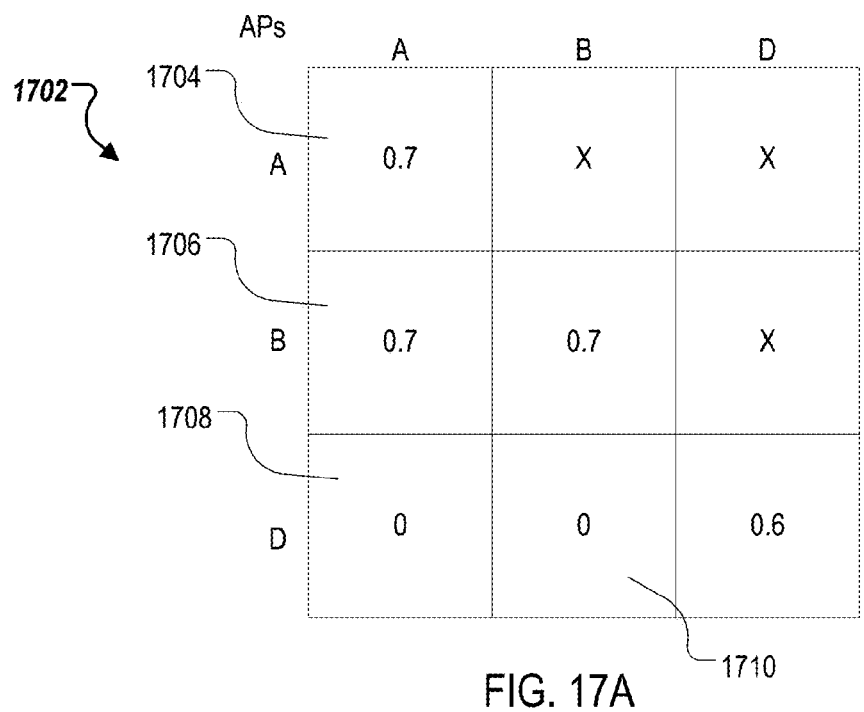
FIGS. 17A and 17B illustrate exemplary affinity matrices for weighting different signal sources.
Figure 17B:
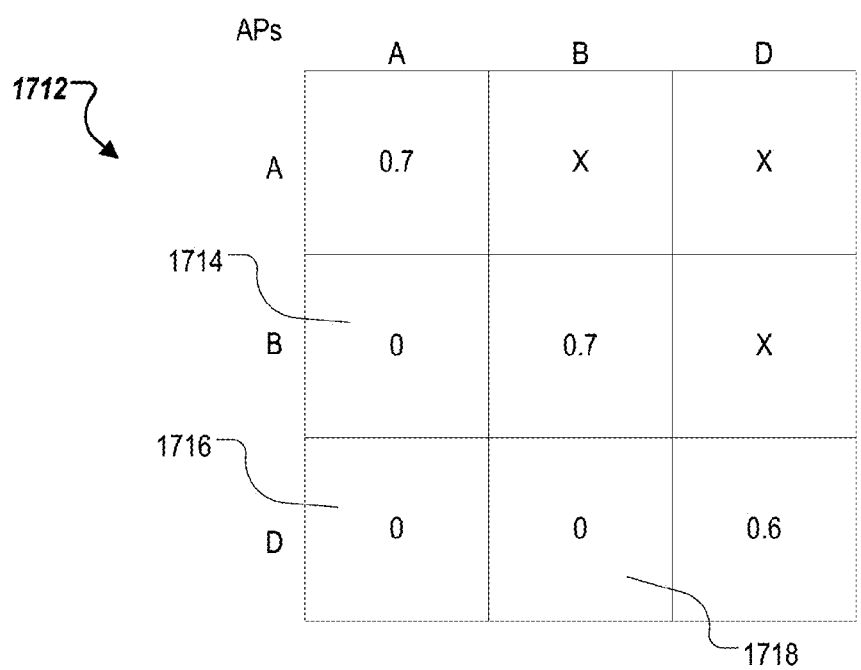

FIGS. 17A and 17B illustrate exemplary affinity matrices for weighting different signal sources. FIG. 17A illustrates exemplary matrix 1702 for signal sources A, B, and D. In matrix 1702, element 1704 (A, A), element 1706 (A, B) and element (B, B) have a same non-zero mutual information entropy, indicating that signals of signal sources A and B have a same distribution. A system can then assign signal sources A and B a same weight such that measurements of signals from signal source A and measurements of signals from signal source B, in combination, will be weighted as a single independent signal source. The system can determine that signal source D, having a mutual information entropy zero, as seen in element 1708 (D, A) and element 1710 (D, B), qualifies as an independent signal source. Accordingly, the system can weight measurements of signals, surveyed or expected, using formula (1) below.

$$M=0.5M_A+0.5M_B+1.0M_D, \quad (1)$$

where M represents a vector of the measurements or expected measurements of signals, $M_A$ represents the measurements or expected measurements of signal source A, $M_B$ represents the measurements or expected measurements of signal source B, and $M_D$ represents the measurements or expected measurements of signal source D.

FIG. 17B illustrates exemplary matrix 1712. In matrix 1712, element 1714 (B, A), element 1716 (D, A) and element 1718 (D, B) have a same mutual information entropy of zero, indicating that signals of signal sources A, B, and D are independent from one another. A system can then assign signal sources A, B, and D a full weight Accordingly, the system can weight measurements of signals, surveyed or expected, using formula (2) below.

$$M=1.0M_A+1.0M_B+1.0M_D, \quad (2)$$

where M represents a vector of the measurements or expected measurements of signals, $M_A$ represents the measurements or expected measurements of signal source A, $M_B$ represents the measurements or expected measurements of signal source B, and $M_D$ represents the measurements or expected measurements of signal source D.

Figure 18:
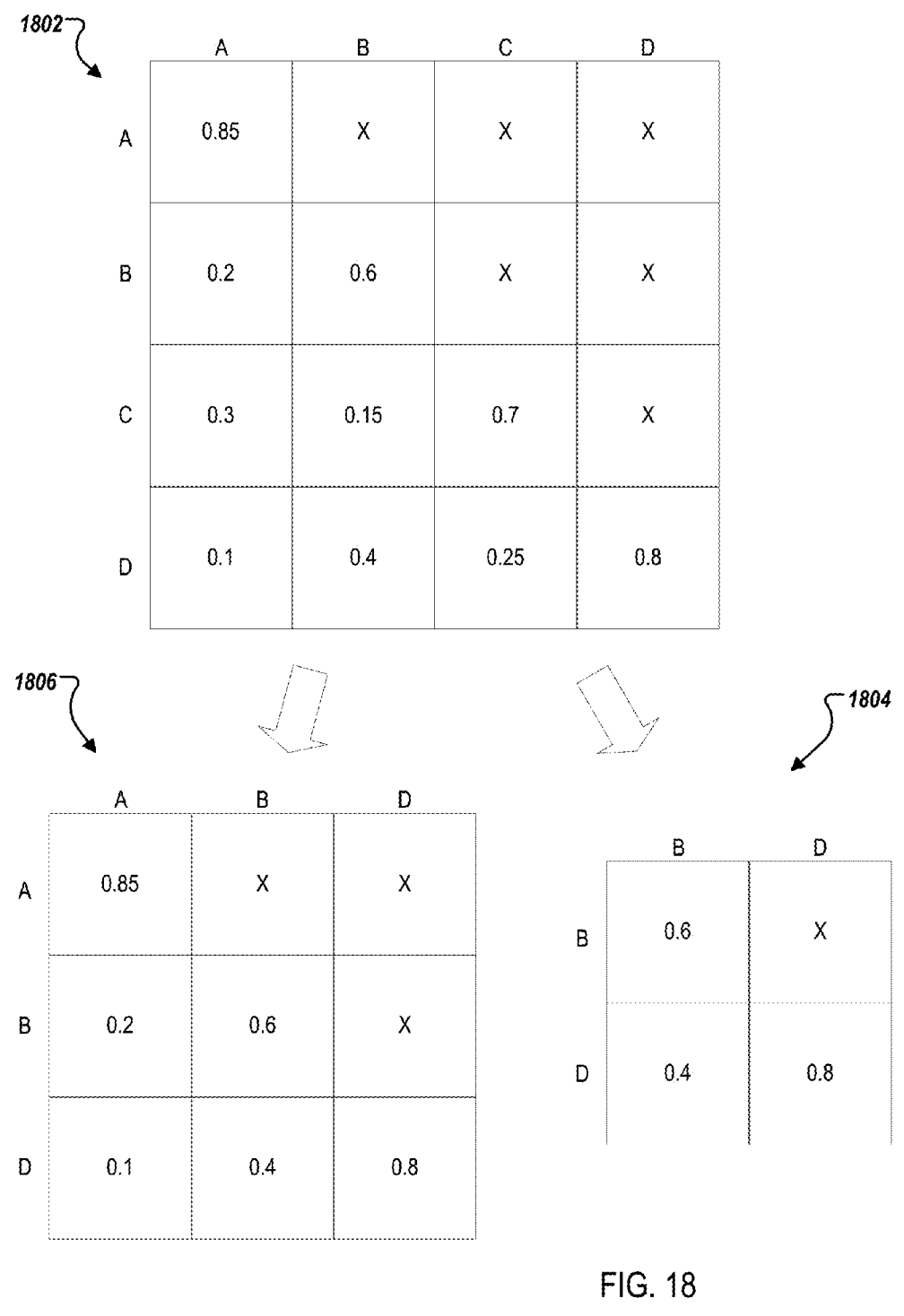

FIG. 18 illustrates exemplary affinity matrices for weighting incoming survey data. When a system determines an affinity matrix, the system can use the affinity matrix to weight incoming sensor scans. The system can be a sampling device, a location server, or a mobile device.

For example, the system can determine an exemplary affinity matrix 1802 for a complete set of signal sources surveyed. The signal sources can include wireless access points A, B, C, and D. The system can determine a sub affinity matrix 1804 for wireless access points B and D. The sub affinity matrix 1804 can include a subsection of affinity matrix 1802 that corresponds to the mutual information entropy values between wireless access points B and D. The subsection can include elements (B, B), (B, D), (D, B), and (D, D). The weight of signals from a signal source I can be calculated using formula (3) below.

$$W_I = \frac{MIE_{(I,I)}}{\sum_{j=1}^{n} MIE_{(I,j)}}, \quad (3)$$

where $W_I$ is weight of signal source I, $MIE_{(I,I)}$ is the designated self information for signal source I, $MIE_{(I,j)}$ is a mutual information entropy value between signal source I and signal source j, and n is a total number of signal sources, counting from one. The system may use sub affinity matrix 1804 for location determination in place of a full affinity matrix. The full affinity matrix may include all of the Wi-Fi access points' MAC addresses in the entire venue, which may number hundreds. When a mobile device performs a Wi-Fi scan, the mobile device may only see a handful of Wi-Fi MAC addresses at one time, which may number a dozen or so. By using sub affinity matrix 1804, the mobile device can reduce data size, e.g., from a 200×200 matrix to a 10×10 matrix.

For example, using formula (3) and sub affinity matrix 1804, the system can determine that the weight of signal source B can be calculated as $W_B=0.6/(0.6+0.4)$, and that weight of signal source D can be calculated as $W_D=0.8/(0.4+0.8)$. Likewise, the system can use formula (3) and sub affinity matrix 1806 of wireless access points A, B, and D as below.

$$W_A=0.85/(0.85+0.2+0.1),$$

$$W_B=0.6/(0.2+0.6+0.4), \text{ and}$$

$$W_D=0.8/(0.1+0.4+0.8).$$

Exemplary Systems

Figure 19:
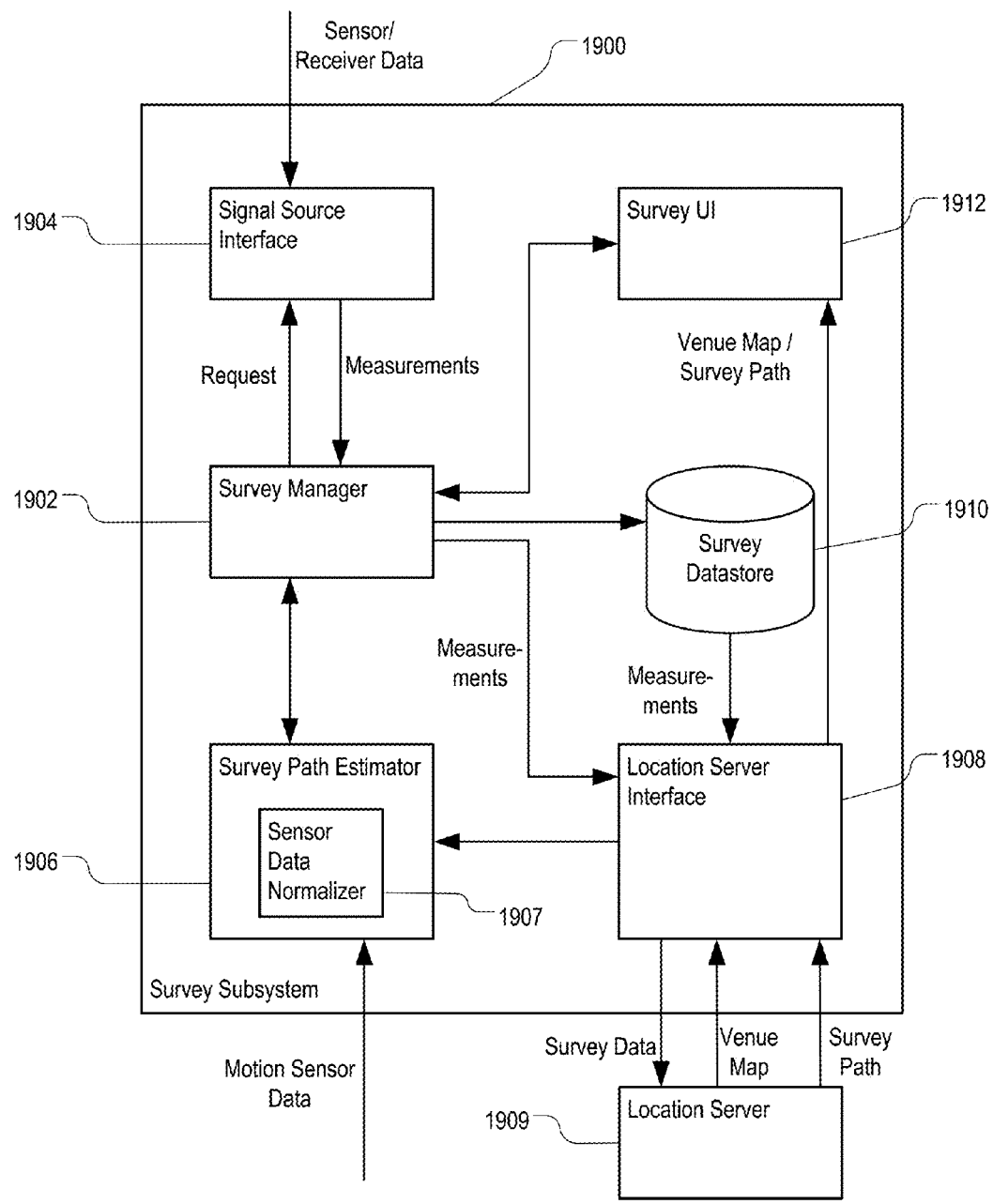
FIG. 19 is a block diagram illustrating exemplary components of a sampling device.

FIG. 19 is a block diagram illustrating components of exemplary survey subsystem 1900 of sampling device 502. Survey subsystem 1900 can include hardware or software components for conducting location surveys for populating a location fingerprint database.

Survey subsystem 1900 can include survey manager 1902. Survey manager 1902 is a component of survey subsystem 1900 configured to manage location surveying functions. Survey manager 1902 can provide rules for scanning channels, recording measurements, determining locations at which measurements are recorded, and managing measurement data. Survey manager 1902 can receive measurement data from signal source interface 1904.

Signal source interface 1904 is a component of survey subsystem 1900 configured to interface with the one or more sensors or receivers of sampling device 502 and provide measurements of the signals and identifiers of the signal sources to survey manager 1902. The measurements can include, for example, an RSSI or a round-trip time when signal sources 206, 208, and 210 are wireless access points, a temperature when signal sources 206, 208, and 210 are heat sources, a sound pressure level when signal sources 206, 208, and 210 are sound sources, a light intensity or spectrum when signal sources 206, 208, and 210 are light sources. In addition, signal source interface 1904 can provide micro-electro-mechanical systems (MEMS) data to survey manager 1902. Survey manager 1902 can associate the measurements with locations at a venue based on survey path data received from survey path estimator 1906.

Survey manager 1902 can receive location path data from survey path estimator 1906. Survey path estimator 1906 is a component of survey subsystem 1900 configured to determine a motion path of sampling device 502 (of FIG. 5A). Survey path estimator 1906 can determine the motion path based on starting points and motion sensor data from one or more motion sensors of sampling device 502, and a venue map provided by location server interface 1908. Survey path estimator 1906 can provide the motion path to survey manager 1902, which, in turn, can use the motion path and MEMS data to determine locations associated with the measurements.

Survey path estimator 1906 can include sensor data normalizer 1907. Sensor data normalizer 1907 is a component of survey path estimator 1906 configured to improve accuracy of location estimation using the motion sensor data. For example, sampling device 502 can determine an estimated location using an average stride length and an accelerometer reading measuring how many steps a surveyor takes. The surveyor may have larger or smaller strides. Accordingly, initially, the estimated location may be incorrect. The surveyor can move the anchor to a correct location, which may be closer to or farther away from a starting location. Based on a difference between the correct location and the initially estimated location, Sensor data normalizer 1907 can replace the average stride length with a stride length corresponding to the particular surveyor. Accordingly, in an estimate of a next location, sampling device 502 can adapt to this particular surveyor.

Location server interface 1908 is a component of survey subsystem 1900 configured to receive venue map and, in some implementations, motion path from location server 1909. Upon receiving the venue map and survey path, location server interface 1908 can submit the venue map and motion path (if any) to survey path estimator 1906. If motion path is submitted to survey path estimator 1906, survey path estimator 1906 can provide the motion path to survey manager 1902.

Survey manager 1902 can associate measurements received from signal source interface 1904 with locations determined based on the survey path data. Survey manager 1902 can designate the result as survey data, and provide the survey data to location server interface 1908 for submitting to a location server. In some implementations, survey manager 1902 can store the survey data in survey data store 1910, for submit to the location server later.

Survey subsystem 1900 can include survey user interface 1912. Survey user interface 1912 can provide a venue map (received from location server interface 1908) for display on sampling device 502. Survey user interface 1912 can provide for display a survey path overlaying on the venue map. Survey user interface 1912 can provide various user interface items for receiving user input for designating starting points, locations of measurements, and adjustment of anchors and motion paths.

Figure 20:
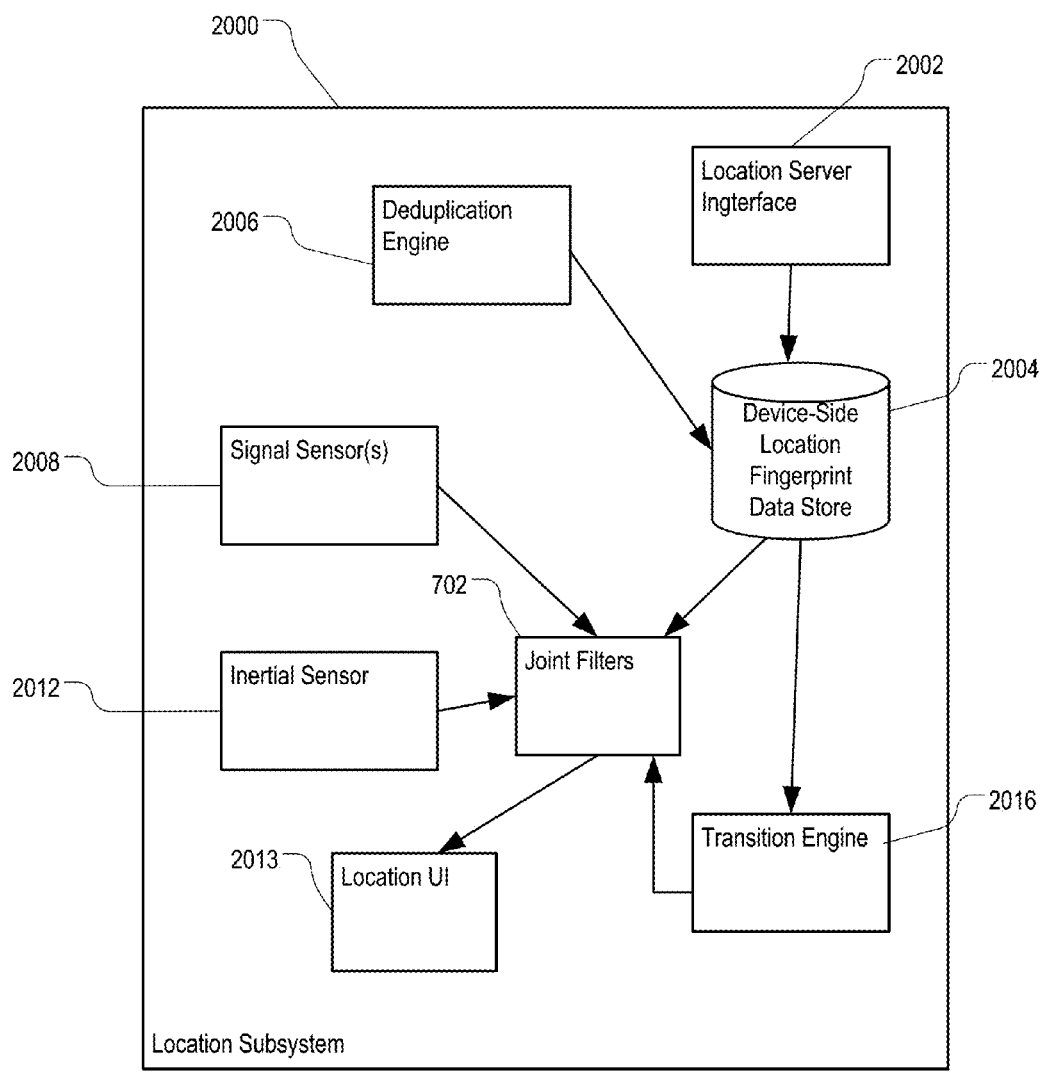
FIG. 20 is a block diagram illustrating components of an exemplary location subsystem of a mobile device.

FIG. 20 is a block diagram illustrating components of exemplary location subsystem 2000 of a mobile device, e.g., mobile device 102 of FIG. 1. Location subsystem 2000 can include hardware or software components for determining a location of the mobile device inside a venue.

Location subsystem 2000 can include location server interface 2002. Location server 2002 is a component of location subsystem 2000 configured to communicate with a location server and download location fingerprint data for one or more venues. Location subsystem 2000 can store the downloaded location fingerprint data in device-side location fingerprint data store 2004.

In some implementations, location subsystem 2000 can include deduplication engine 2006. Deduplication engine 2006 is a component of location subsystem 2000 configured to perform location de-duplication operations described in reference to FIGS. 16-18.

Location subsystem 2000 can include one or more signal sensors 2008 for detecting signals, e.g., RF signals, from one or more signal sources, e.g., wireless access points. The one or more signal sensors 2008 can determine one or more measurements of each signal and provide the measurements to joint filters 702.

Location subsystem 2000 can include one or more inertial sensors 2012 for measuring linear and angular motion, acceleration, or both, of a mobile device. The inertial sensors 2012 can include an accelerometer, a gyroscope, or both. The one or more inertial sensors 2012 can provide the measurements to joint filters 702.

Joint filters 702 are components of location subsystem 2000 configured to perform operations described in reference to FIGS. 10A-13 for determining an estimated location of the mobile device and an estimated heading of the mobile device. Joint filters 702 can provide the estimated location and estimated heading to location user interface 2014. Location user interface 2014 is a component of location subsystem 2000 configured to overlay the estimated location and estimated heading on a map of a venue, and to provide the overlaid map for display on a display screen.

Location subsystem 2000 can include transition engine 2016. Transition engine 2016 is a component of location subsystem 2000 configured to provide data, e.g., imaginary particles, to joint filters 702 for determining a transition of a mobile device between locations. The transition can include movement of the mobile device between different portions, e.g., buildings or floors, of a venue. Each portion of the venue can correspond to a unique map of the portion. The transition can include movement of the mobile device from a venue to outside of a venue.

Figure 21:
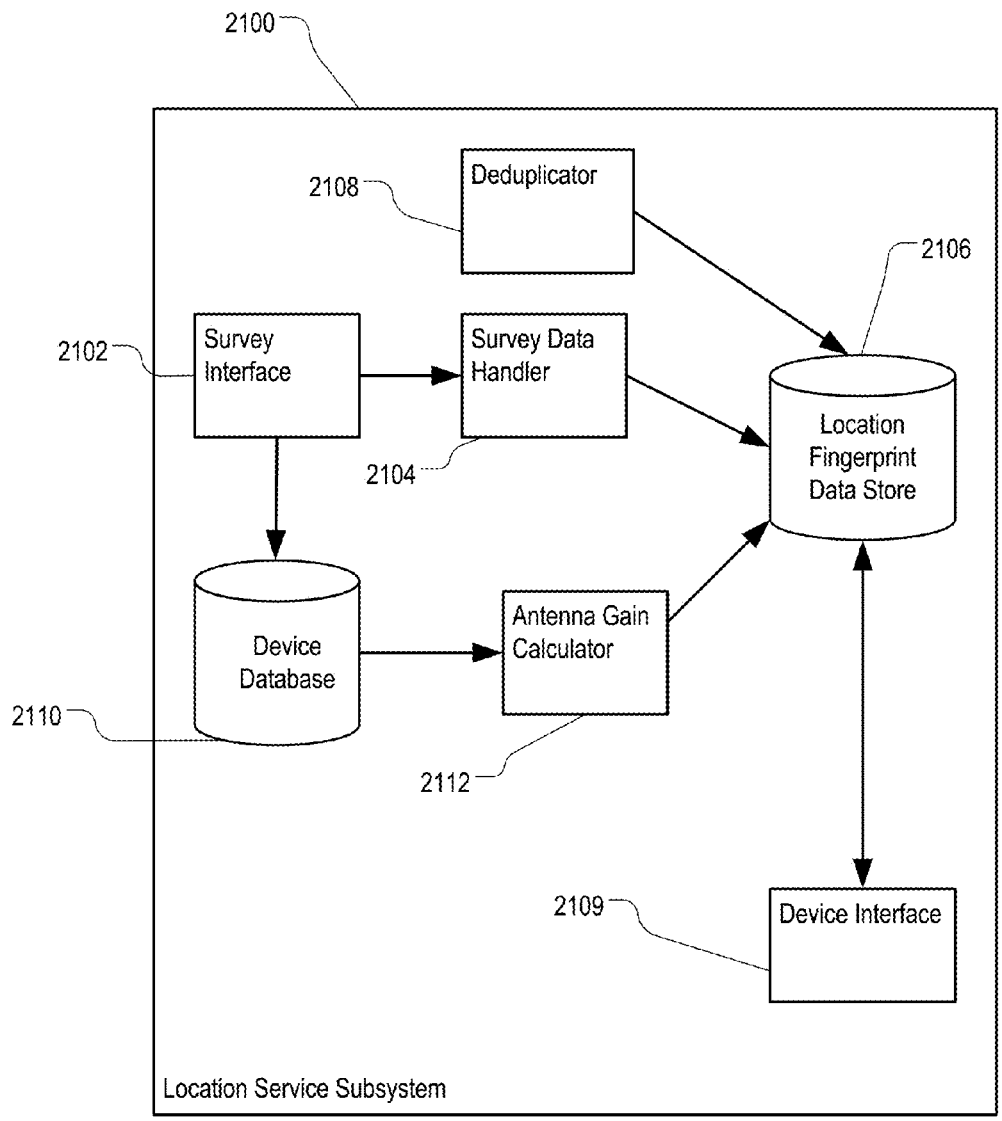
FIG. 21 is a block diagram illustrating exemplary components of location service subsystem of a location server.

FIG. 21 is a block diagram illustrating exemplary components of location service subsystem 2100 of a location server. Location service subsystem 2100 can include hardware or software components for determining a location fingerprint database for various venues.

Location service subsystem 2100 can include survey interface 2102. Survey interface 2102 is a component of location service subsystem 2100 configured to provide list of venues to survey, maps of the venues to survey, and receive survey data from one or more devices. Survey interface 2102 can provide the received survey data to survey data handler 2104.

Survey data handler 2104 is a component of location service subsystem 2100 configured to perform operations described in reference to FIG. 5B, including stitching together surveys of a same venue by different sampling devices, and interpolating and extrapolating expected measurement of unsurveyed areas of each venue. Survey data handler 2104 can generate location fingerprint data for storing in server-side location fingerprint database 2106. Service-side location fingerprint database 2106 can store location fingerprint data for multiple venues and provide the location fingerprint data for specific venues to a requesting mobile device for download.

In some implementations, location service subsystem 2100 can include deduplicator 2108. Deduplicator 2108 is a component of location service subsystem 2100 configured to perform, on a location server, location deduplication operations as described in reference to FIGS. 16-18.

Location service subsystem 2100 can include device interface 2109 for communicating with mobile devices requesting location fingerprint data. In response to the requests, device interface 2109 can retrieve location fingerprint data for one or more venues from server-side location fingerprint database 2106, and provide to the requesting mobile device the retrieved location fingerprint data. In some implementations, device interface 2109 can provide virtual maps of the venues in association with the location fingerprint data.

Location service subsystem 2100 can include device database 2110. Device database 2110 can store information on different makes and models of mobile devices, and different characteristics of antenna gains of the devices as determined from survey data from survey interface 2102. An antenna gain calculator 2112 can determine the different antenna gains stored in device database 2110, and add device type as a separate dimension in the location fingerprint data as stored in server-side location fingerprint database 2106.

Exemplary Procedures

Figure 22:
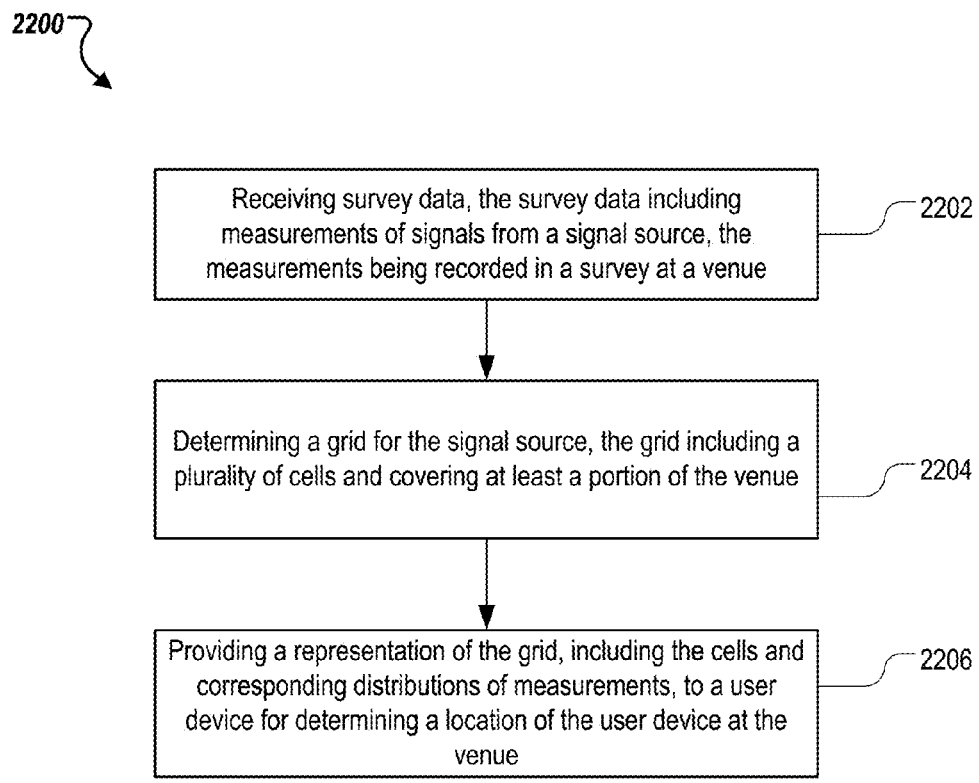
FIG. 22 is a flowchart of an exemplary process of determining location fingerprint data.

FIG. 22 is a flowchart of an exemplary process 2200 of determining location fingerprint data. Process 2200 can be performed by a location server, e.g., a location server including location service subsystem 2100 of FIG. 21.

The location server can receive (2202) survey data. The survey data can include measurements of signals from a signal source. The measurements can be recorded in a survey of a venue. The signal source can be an RF signal source. The measurements include at least one of RSSI or RTT of RF signals from the signal source.

The location server can determine (2204) a grid for the signal source. The grid can include multiple cells and cover at least a portion of the venue. Each cell can correspond to a portion of the venue and is associated with a distribution of measurements of the signals from the signal source as recorded in the cell. Each cell can have a cell size corresponding to a number of measurements recorded at the venue, wherein more measurements correspond to smaller cell. Each cell can be a rectangular area, e.g., a square. Each cell can be associated with a number of measurements recorded in the cell. The number of measurements can indicate a statistical confidence for determining the location of the user device in the venue. A higher number can indicate higher confidence.

In some implementations, the distribution of measurements of signals includes a discrete distribution of a set of ranges of signal strength measurements and a number of measurements corresponding to each range. In some implementations, the distribution of measurements of signals includes a continuous distribution of a number of measurements over signal strength values, the continuous distributions being determined by performing a statistical fit of the number measurements over the signal strength values.

The location server can provide (2206) a representation of the grid, including the cells and corresponding distributions of measurements, to a user device as location fingerprint data for determining a location of the user device at the venue by matching readings of a sensor of the user device to the distributions of measurements in the grid. Determining the location of the user device at the venue can include the location of the user device at the venue can include eliminating impossible locations in the venue where the user device is expected to have measurements corresponding to a cell but does not receive those measurements.

Figure 23:
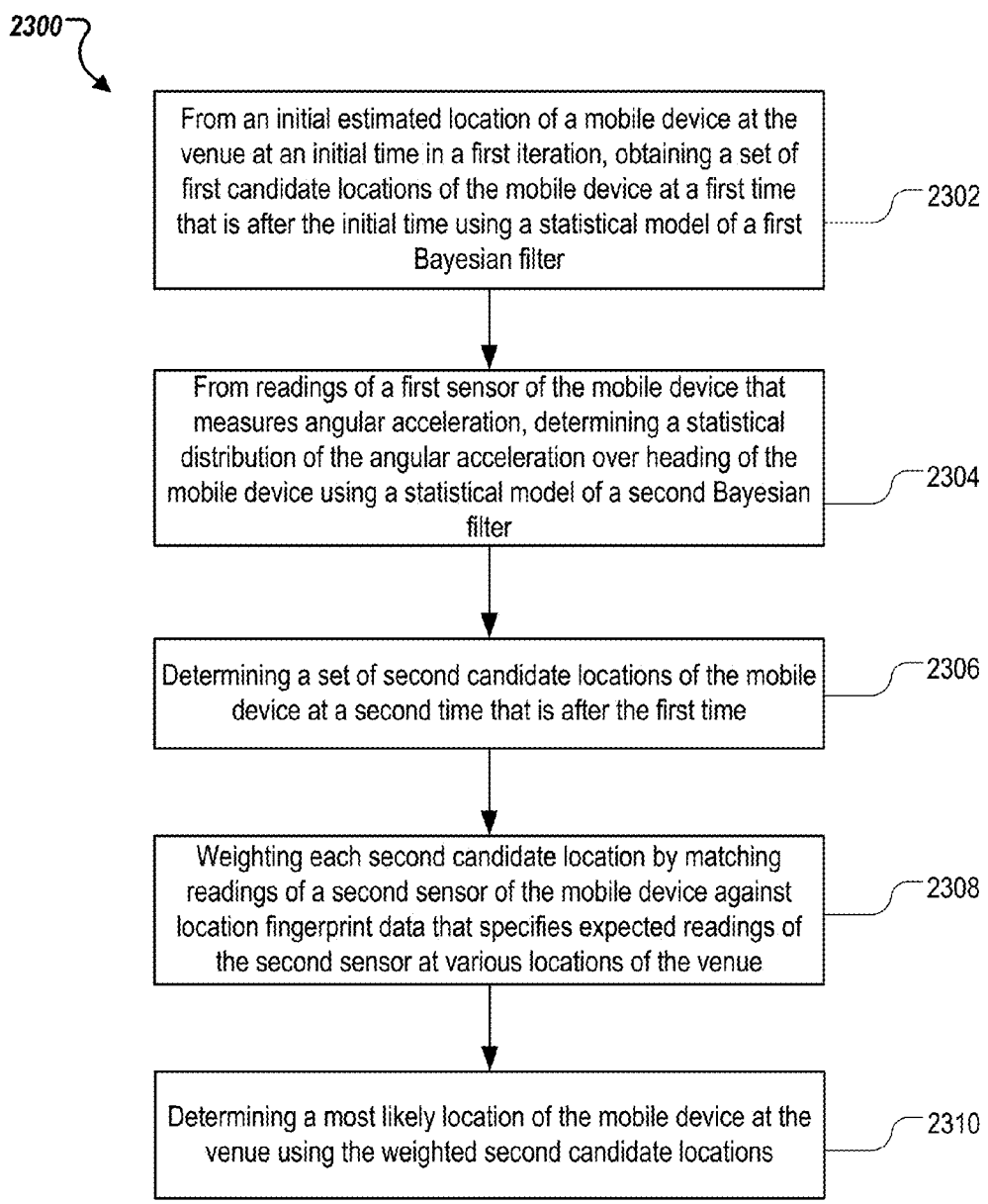
FIG. 23 is a flowchart of an exemplary process of location determination using joint filters.

FIG. 23 is a flowchart of an exemplary process 2300 of location determination using joint filters. Process 2300 can be performed by a mobile device, e.g., mobile device 102 of FIG. 1.

From an initial estimated location of the mobile device at the venue at an initial time in a first iteration, the mobile device can obtain (2302) a set of first candidate locations of the mobile device at a first time that is after the initial time. The mobile device can determine the initial estimated location using a Gaussian random noise at a coarse location. The coarse location can be a location determined using MAC address matching. The mobile can obtain the set of first candidate locations using a statistical model of a first Bayesian filter. Each first candidate location can be represented using location coordinates and can be associated with a respective heading. Obtaining the set of first candidate locations of the mobile device can include determining the first candidate locations by applying a statistical random noise to the initial estimated location, the statistical random noise having a specified variance per unit time. The specified variance per unit time can include a uniform variance per unit time, a constantly growing variance per unit time, or linearly growing variance per unit time. The mobile device can infer the heading from a direction from the initial estimated location to a respective candidate position. The first Bayesian filter is a type of particle filter where each particle is a candidate location.

From readings of a first sensor of the mobile device that measures angular value, e.g., an angle, angular velocity, or angular acceleration, the mobile device can determine (2304) a statistical distribution of the angular movement as a function of heading of the mobile device using a statistical model of a second Bayesian filter. The first sensor can include a gyroscope or magnetometer. The second Bayesian filter is a type of Kalman filter using reading of the first sensor as input. The first sensor can include a gyroscope, magnetometer, or a derived sensor that includes a statistical signal processing unit that applies the statistical processing to a motion sensor such as an accelerometer.

The mobile device can determine (2306) a set of second candidate locations of the mobile device at a second time that is after the first time. Each second candidate location is determined using a first candidate location and a respective heading that has been adjusted according to the statistical distribution of the angular value.

The mobile device can weight (2308) each second candidate location by matching readings of a second sensor of the mobile device against location fingerprint data that specifies expected readings of the second sensor at various locations of the venue, including giving higher weight to a second candidate location that has a higher degree of match. The second sensor can include a wireless receiver. The expected readings of the second sensor can include at least one of expected RSSI of RF signals or RTT of the RF signals. The expected readings of the second sensor can be associated with multiple grids, each grid corresponding to a different signal source, e.g., a different wireless access point. Each grid can have multiple cells, and cover at least a portion of the venue.

In some implementations, the mobile device can adjust a parameter of a model that defines the first Bayesian filter. For example, the mobile device can adjust parameter including a stride length using results of weighting each second candidate location. In some implementations, the mobile device can adjust a bias of the first sensor of the mobile device using results of weighting each second candidate location. Adjusting the bias includes adjusting parameters of the statistical distribution of the angular value over heading of the mobile device for a next iteration of location estimation. Adjusting parameters of the statistical distribution of the angular value over heading can include inducing weight on central moments of measurements of the first sensor from the weighted second candidate locations.

The mobile device can determine (2310) a most likely location of the mobile device at the venue using the weighted second candidate locations. The mobile device can designate the most likely location as an estimated location of the mobile device at the second time. The mobile device can designate the most likely location of the mobile device as the initial estimated location of the mobile device in a next iteration. In the next iteration, each respective heading can be adjusted according to the statistical distribution of the angular value having the adjusted bias.

Figure 24A:
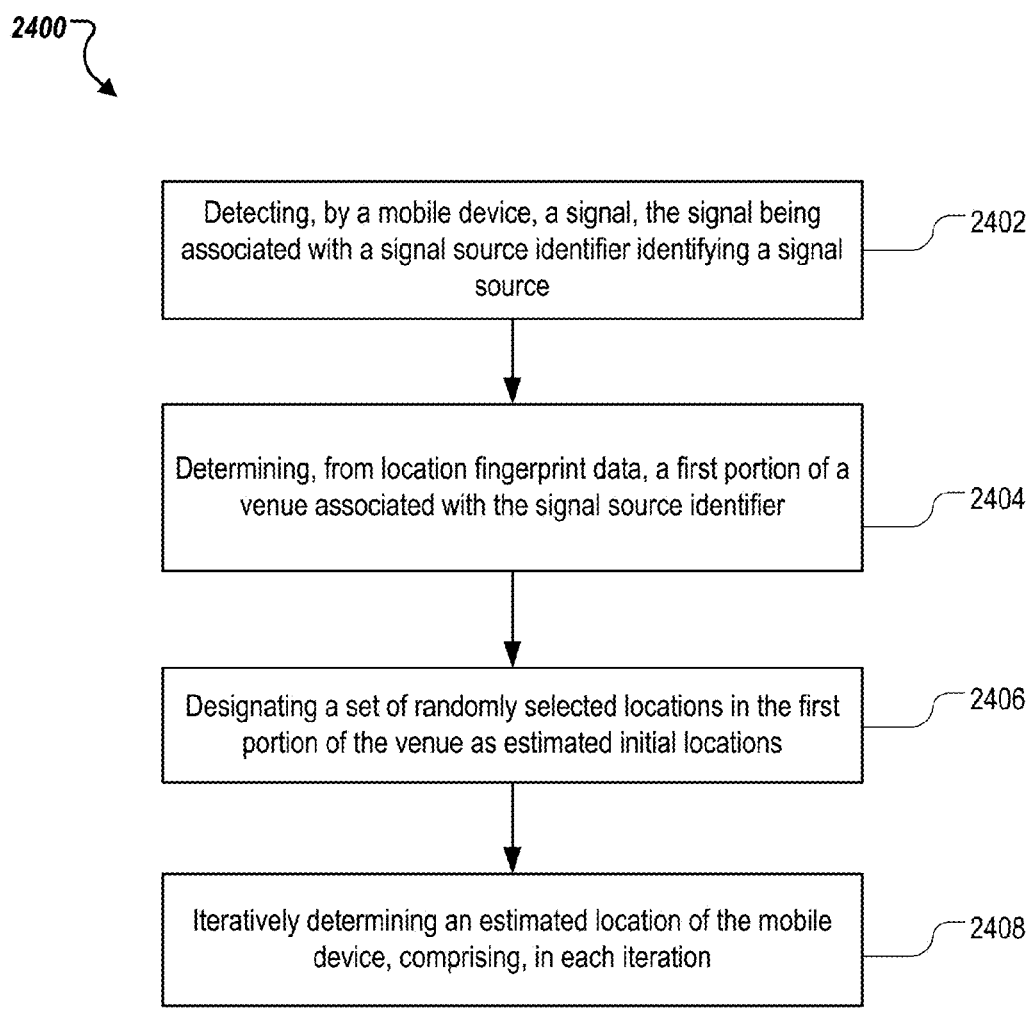
FIGS. 24A and 24B are flowcharts of an exemplary process 2400 of determining location transition.
Figure 24B:
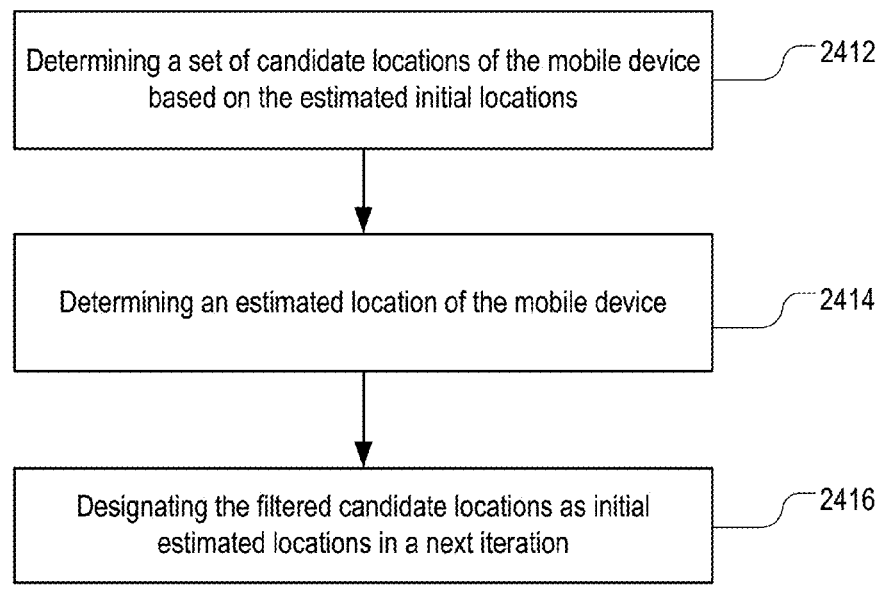

FIGS. 24A and 24B are flowcharts of an exemplary process 2400 of determining location transition. Process 2400 can be performed by a mobile device, e.g., mobile device 102 of FIG. 1.

The mobile device can detect (2402) a signal, the signal being associated with a signal source identifier identifying a signal source. The signal source can be an RF signal source. The signal source identifier can be a media access control (MAC) address of the RF signal source.

The mobile device can determine (2404), from location fingerprint data, a first portion of a venue associated with the signal source identifier. The location fingerprint data including expected measurements of signals at various areas of the venue and expected identifiers of signal sources detectable at the various areas of the venue, the first portion of the venue including areas in the venue where signals from the signal source are expected to be detectable. The expected measurements can be RSSIs or RTTs of RF signals from the signal source.

The mobile device can designate (2406) a set of randomly selected locations in the first portion of the venue as estimated initial locations.

The mobile device can iteratively determine (2408) an estimated location of the mobile device. In each iteration, the mobile device can determine (2412) a set of candidate locations of the mobile device based on the estimated initial locations. Determining the set of candidate locations can include determining a first portion of the set of candidate locations in the first portion of the venue. The first portion of the set of candidate locations can be determined using locations corresponding to Gaussian random noise applied to the estimated initial locations. The mobile device can determine a second portion of the set of candidate locations in a second portion of the venue that is different from the first portion of the venue and where signals from the signal source are expected to be undetectable. The second portion of the set of candidate locations can be determined using a uniform distribution of locations in the second portion of the venue. The third portion of the set of candidate locations can be determined using a uniform distribution of locations outside of the venue. The mobile device determines a third portion of the candidate locations outside of the venue. The mobile device then assigns a respective weight to each of the first, second, and third portions of the candidate locations.

Each portion of the venue is designated in the location fingerprint data using multiple rectangular cells. The cells can form a grid that covers the venue.

In each iteration, the mobile device can determine that matching between measurements of the signal with the expected measurements of the first portion of the candidate locations is less likely than matching between the measurements of the signal and expected measurements in the second portion and the third portion of the candidate locations. In response, the mobile device can increase a weight corresponding to the second portion of the candidate locations and the third portion of the candidate locations in the next iteration. The mobile device can accumulate respective weights of the each portion of the candidate locations over time. The mobile device can apply a threshold to respective accumulated weights for switching on or off various subsystems of the mobile device In each iteration, the mobile device can determine, based on a lack of matching between measurements of the signal with the expected measurements of the first portion of the venue and a lack of matching between measurements of the signal with the expected measurements of the first portion of the venue, that a probability that the mobile device is located in any cell in the venue is below a first threshold. In response, the mobile device can switching off a subsystem of the mobile device for location determination based on wireless access point signals, e.g., location subsystem 2000 of FIG. 20.

The mobile device can determine that the probability is below a second threshold. In response, the mobile device can switch on a subsystem of the mobile device for satellite signal based location determination. The second threshold can be different from the threshold. Accordingly, the mobile device may use both subsystems to determine a location simultaneously at various times.

The mobile device can determine (2414) an estimated location of the mobile device for the iteration, including filtering the weighted candidate locations by matching measurements of the signal with the expected measurements in the location fingerprint. Determining the estimated location of the mobile device can include determining an estimated heading of the mobile device based on a joint filtering the weighted candidate locations using a first Bayesian filter that is a type of particle filter and a second Bayesian filter that is a type of Kalman filter, the second Bayesian filter using readings of a gyroscope of the mobile device or readings of a magnetometer of the mobile device as input. The mobile device can designate (2416) the filtered candidate locations as initial estimated locations in a next iteration.

Figure 25:
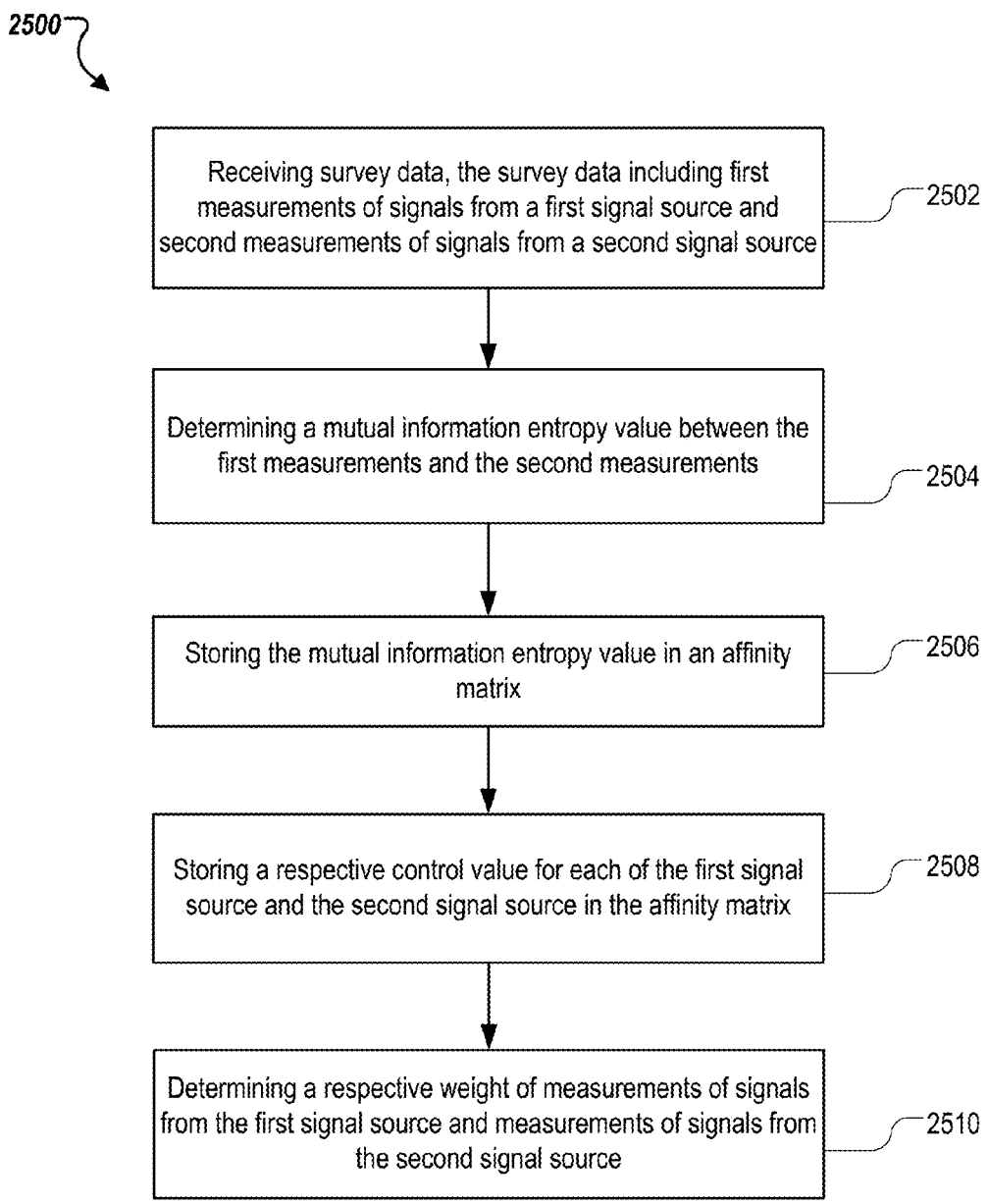
FIG. 25 is a flowchart of an exemplary process of survey data de-duplication.

FIG. 25 is a flowchart of an exemplary process 2500 of survey data de-duplication. Process 2500 can be performed by a system including a mobile device, e.g., mobile device 102 of FIG. 1, or a location server, e.g., a location server including location service subsystem 2100 of FIG. 21, or both.

The system can receive (2502) survey data from one or more sampling devices. The survey data can include first measurements of signals from a first signal source, e.g., access point B of FIG. 18, and second measurements of signals from a second signal source, e.g., access point D of FIG. 18.

The system can determine (2504) a mutual information entropy value between the first measurements and the second measurements. The mutual information entropy value can measure a degree of mutual dependency between the first measurements and the second measurements.

The system can store (2506) the mutual information entropy value in an affinity matrix having a first dimension corresponding to the first signal source and the second signal source and a second dimension corresponding to the first signal source and the second signal source. Determining the mutual information entropy value can determining a degree of linear correspondence between the first measurements and the second measurements. A higher degree of linear correspondence corresponds to a higher mutual information entropy value.

The system can store (2508) a respective control value for each of the first signal source and the second signal source in the affinity matrix, each control value measuring a degree of dependency between measurements obtained in a first survey of the respective signal source and measurements obtained in a second survey of the respective signal source. The first survey and second survey are conducted at a same venue. The first survey and second survey can be conducted at different time or by different sampling devices.

The system can determine (2510) a respective weight of measurements of signals from the first signal source and measurements of signals from the second signal source. The weights can be used in location determination at the venue using the signals from the first and second signal sources, respectively. Determining each weight respective to the signal source includes determining a ratio between a control value of the signal source and a sum of the control value of the signal source and the mutual information entropy value, e.g., a Jaccard index. Each weight can be applied to a measurement of a signal of a respective signal source as determined by a mobile device configured to determine a location, at the venue, of the mobile device.

The system can determine a respective weight of the first signal source, e.g., access point B of FIG. 18, and the second signal source, e.g., access point D of FIG. 18, against a third signal source e.g., access point A of FIG. 18, based on a respective mutual information entropy value of the respective signal source and the third signal source and based on a control value of the third signal source.

Exemplary System Architecture

Figure 26:
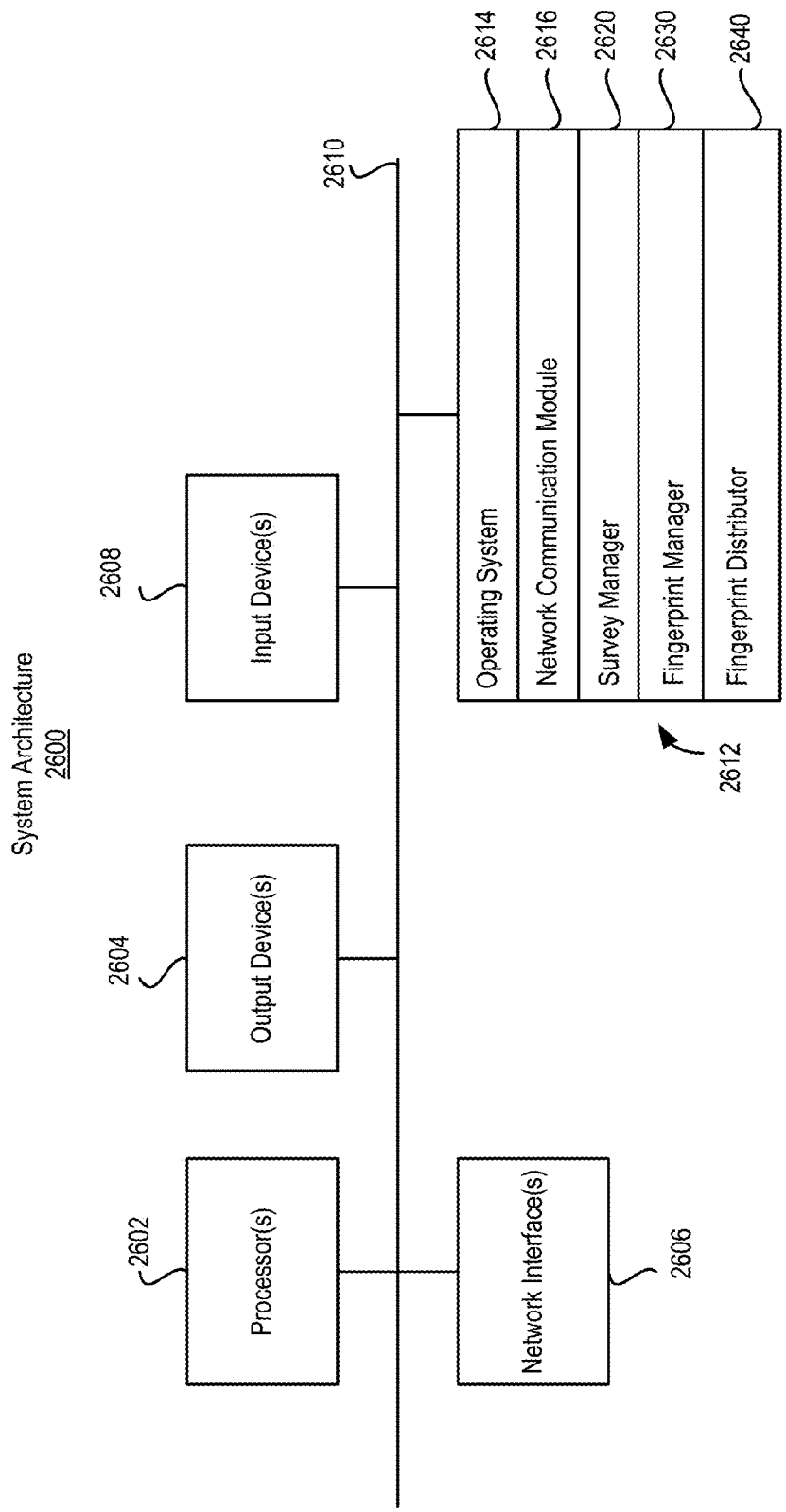
FIG. 26 is a block diagram of an exemplary system architecture for implementing the features and operations of FIGS. 1-25.

FIG. 26 is a block diagram of an exemplary system architecture for implementing the features and operations of FIGS. 1-25. Other architectures are possible, including architectures with more or fewer components. In some implementations, architecture 2600 includes one or more processors 2602 (e.g., dual-core Intel® Xeon® Processors), one or more output devices 2604 (e.g., LCD), one or more network interfaces 2606, one or more input devices 2608 (e.g., mouse, keyboard, touch-sensitive display) and one or more computer-readable mediums 2612 (e.g., RAM, ROM, SDRAM, hard disk, optical disk, flash memory, etc.). These components can exchange communications and data over one or more communication channels 2610 (e.g., buses), which can utilize various hardware and software for facilitating the transfer of data and control signals between components.

The term "computer-readable medium" refers to a medium that participates in providing instructions to processor 2602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 2612 can further include operating system 2614 (e.g., a Linux® operating system), network communication module 2616, survey manager 2620, fingerprint manager 2630, and fingerprint distributor 2640. Operating system 2614 can be multi-user, multiprocessing, multitasking, multithreading, real time, etc. Operating system 2614 performs basic tasks, including but not limited to: recognizing input from and providing output to devices 2606, 2608; keeping track and managing files and directories on computer-readable mediums 2612 (e.g., memory or a storage device); controlling peripheral devices; and managing traffic on the one or more communication channels 2610. Network communications module 2616 includes various components for establishing and maintaining network connections (e.g., software for implementing communication protocols, such as TCP/IP, HTTP, etc.).

Survey manager 2620 can include computer instructions that, when executed, cause processor 2602 to provide survey instructions and maps to a sampling device (e.g., sampling device 502 of FIG. 5A) and receive survey data from the sampling device. Fingerprint manager 2630 can include computer instructions that, when executed, cause processor 2602 to perform operations of deduplicator 2108, survey data handler 2104, and antenna gain calculator 2112 as described in reference to FIG. 21. Fingerprint distributor 2640 can include computer instructions that, when executed, cause processor 2602 to respond a fingerprint request from a mobile device (e.g., mobile device 102 of FIG. 1), including sending location fingerprint data to the requesting mobile device.

Architecture 2600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Exemplary Mobile Device Architecture

Figure 27:
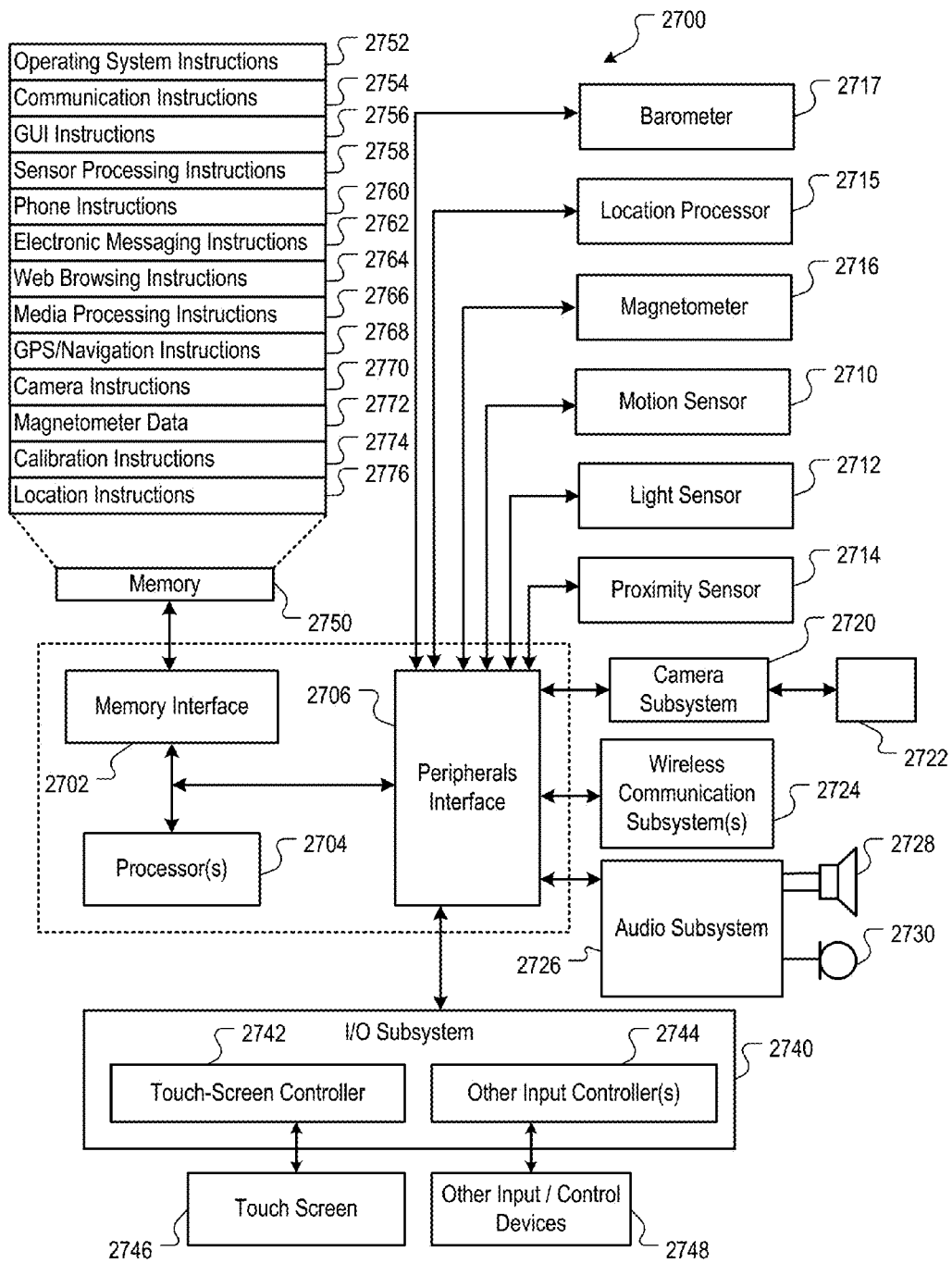
FIG. 27 is a block diagram illustrating an exemplary device architecture of a mobile device implementing the features and operations described in reference to FIGS. 1-25.

FIG. 27 is a block diagram of an exemplary architecture 2700 for the mobile devices of FIGS. 1-25. A mobile device (e.g., mobile device 102 or sampling device 502) can include memory interface 2702, one or more data processors, image processors and/or processors 2704, and peripherals interface 2706. Memory interface 2702, one or more processors 2704 and/or peripherals interface 2706 can be separate components or can be integrated in one or more integrated circuits. Processors 2704 can include application processors, baseband processors, and wireless processors. The various components in a mobile device, for example, can be coupled by one or more communication buses or signal lines.

Sensors, devices, and subsystems can be coupled to peripherals interface 2706 to facilitate multiple functionalities. For example, motion sensor 2710, light sensor 2712, and proximity sensor 2714 can be coupled to peripherals interface 2706 to facilitate orientation, lighting, and proximity functions of the mobile device. Location processor 2715 (e.g., GPS receiver) can be connected to peripherals interface 2706 to provide geopositioning. Electronic magnetometer 2716 (e.g., an integrated circuit chip) can also be connected to peripherals interface 2706 to provide data that can be used to determine the direction of magnetic North. Thus, electronic magnetometer 2716 can be used as an electronic compass. Motion sensor 2710 can include one or more accelerometers configured to determine change of speed and direction of movement of the mobile device. Barometer 2717 can include one or more devices connected to peripherals interface 2706 and configured to measure pressure of atmosphere around the mobile device.

Camera subsystem 2720 and an optical sensor 2722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2724, which can include radio frequency receivers and transmitters and/or optical (e.g., infrared) receivers and transmitters. The specific design and implementation of the communication subsystem 2724 can depend on the communication network(s) over which a mobile device is intended to operate. For example, a mobile device can include communication subsystems 2724 designed to operate over a GSM network, a GPRS network, an EDGE network, a Wi-Fi™ or WiMax™ network, and a Bluetooth™ network. In particular, the wireless communication subsystems 2724 can include hosting protocols such that the mobile device can be configured as a base station for other wireless devices.

Audio subsystem 2726 can be coupled to a speaker 2728 and a microphone 2730 to facilitate voice-enabled functions, such as voice recognition, voice replication, digital recording, and telephony functions. Audio subsystem 2726 can be configured to receive voice commands from the user.

I/O subsystem 2740 can include touch surface controller 2742 and/or other input controller(s) 2744. Touch surface controller 2742 can be coupled to a touch surface 2746 or pad. Touch surface 2746 and touch surface controller 2742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 2746. Touch surface 2746 can include, for example, a touch screen.

Other input controller(s) 2744 can be coupled to other input/control devices 2748, such as one or more buttons, rocker switches, thumb-wheel, infrared port, USB port, and/or a pointer device such as a stylus. The one or more buttons (not shown) can include an up/down button for volume control of speaker 2728 and/or microphone 2730.

In one implementation, a pressing of the button for a first duration may disengage a lock of the touch surface 2746; and a pressing of the button for a second duration that is longer than the first duration may turn power to sampling device 502 on or off. The user may be able to customize a functionality of one or more of the buttons. The touch surface 2746 can, for example, also be used to implement virtual or soft buttons and/or a keyboard.

In some implementations, sampling device 502 can present recorded audio and/or video files, such as MP3, AAC, and MPEG files. In some implementations, a mobile device can include the functionality of an MP3 player. The mobile device may, therefore, include a pin connector that is compatible with the iPod. Other input/output and control devices can also be used.

Memory interface 2702 can be coupled to memory 2750. Memory 2750 can include high-speed random access memory and/or non-volatile memory, such as one or more magnetic disk storage devices, one or more optical storage devices, and/or flash memory (e.g., NAND, NOR). Memory 2750 can store operating system 2752, such as Darwin, RTXC, LINUX, UNIX, OS X, WINDOWS, or an embedded operating system such as VxWorks. Operating system 2752 may include instructions for handling basic system services and for performing hardware dependent tasks. In some implementations, operating system 2752 can include a kernel (e.g., UNIX kernel).

Memory 2750 may also store communication instructions 2754 to facilitate communicating with one or more additional devices, one or more computers and/or one or more servers. Memory 2750 may include graphical user interface instructions 2756 to facilitate graphic user interface processing; sensor processing instructions 2758 to facilitate sensor-related processing and functions; phone instructions 2760 to facilitate phone-related processes and functions; electronic messaging instructions 2762 to facilitate electronic-messaging related processes and functions; web browsing instructions 2764 to facilitate web browsing-related processes and functions; media processing instructions 2766 to facilitate media processing-related processes and functions; GPS/Navigation instructions 2768 to facilitate GPS and navigation-related processes and instructions; camera instructions 2770 to facilitate camera-related processes and functions; magnetometer data 2772 and calibration instructions 2774 to facilitate magnetometer calibration. The memory 2750 may also store other software instructions (not shown), such as security instructions, web video instructions to facilitate web video-related processes and functions, and/or web shopping instructions to facilitate web shopping-related processes and functions. In some implementations, the media processing instructions 2766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 2750. Memory 2750 can store location instructions 2776. Location instructions 2776 can include survey instructions that, when executed, cause processor 2704 to perform operations of performing indoor survey at a venue. Location instructions 2776 can include location determination instructions that, when executed, cause processor 2704 to perform operations of location subsystem 2000 as described in reference to FIG. 20.

Each of the above identified instructions and applications can correspond to a set of instructions for performing one or more functions described above. These instructions need not be implemented as separate software programs, procedures, or modules. Memory 2750 can include additional instructions or fewer instructions. Furthermore, various functions of the mobile device may be implemented in hardware and/or in software, including in one or more signal processing and/or application specific integrated circuits.

Exemplary Operating Environment

Figure 28:
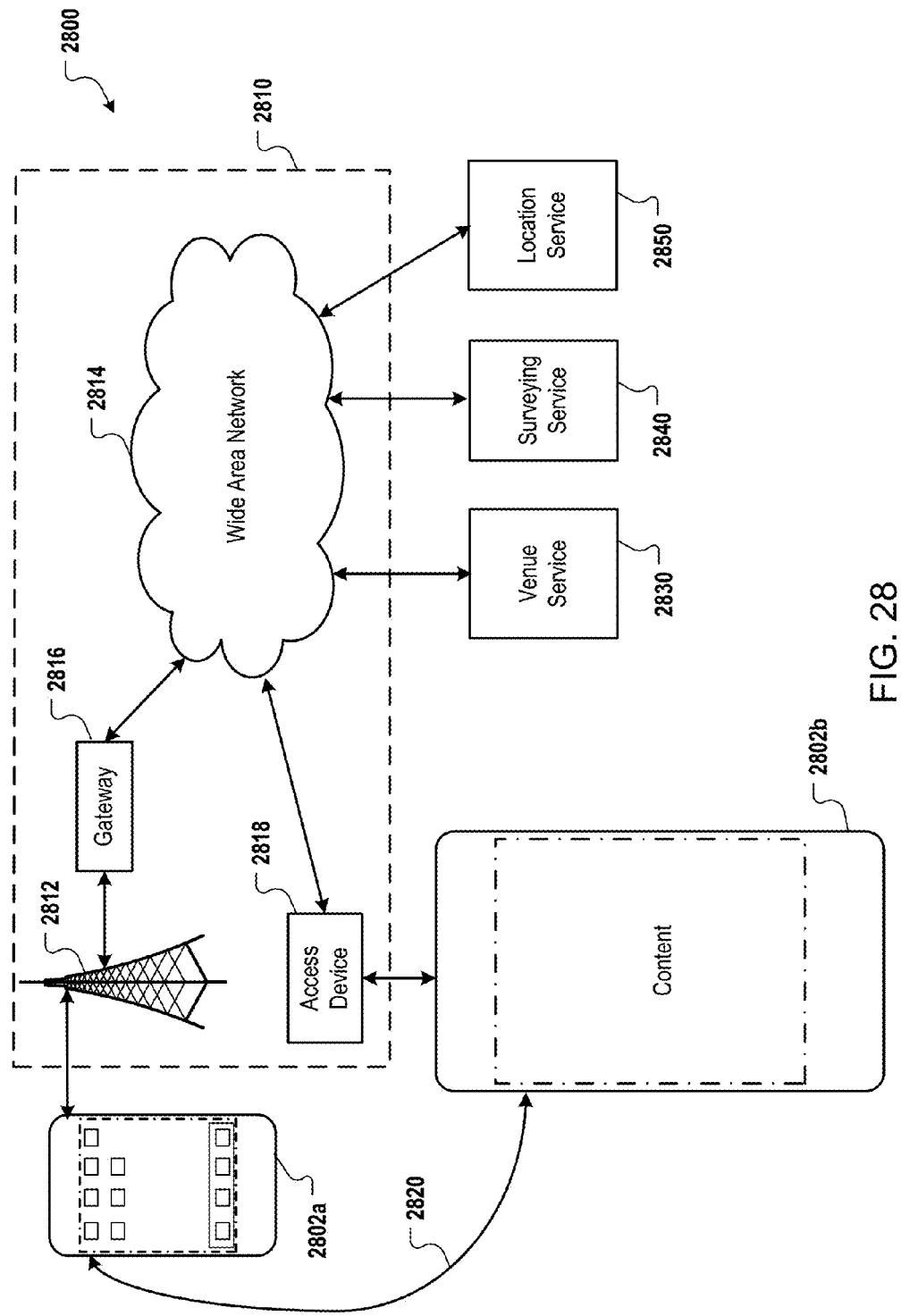
FIG. 28 is a block diagram of an exemplary network operating environment for the mobile devices of FIGS. 1-25.

FIG. 28 is a block diagram of an exemplary network operating environment 2800 for the mobile devices of FIGS. 1-25. Mobile devices 2802*a* and 2802*b* can, for example, communicate over one or more wired and/or wireless networks 2810 in data communication. For example, a wireless network 2812, e.g., a cellular network, can communicate with a wide area network (WAN) 2814, such as the Internet, by use of a gateway 2816. Likewise, an access device 2818, such as an 802.11g wireless access point, can provide communication access to the wide area network 2814. Each of mobile devices 2802*a* and 2802*b* can be mobile device 102 or sampling device 502.

In some implementations, both voice and data communications can be established over wireless network 2812 and the access device 2818. For example, mobile device 2802*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 2812, gateway 2816, and wide area network 2814 (e.g., using Transmission Control Protocol/Internet Protocol (TCP/IP) or User Datagram Protocol (UDP)). Likewise, in some implementations, the mobile device 2802b can place and receive phone calls, send and receive e-mail messages, and retrieve electronic documents over the access device 2818 and the wide area network 2814. In some implementations, mobile device 2802a or 2802b can be physically connected to the access device 2818 using one or more cables and the access device 2818 can be a personal computer. In this configuration, mobile device 2802a or 2802b can be referred to as a "tethered" device.

Mobile devices 2802a and 2802b can also establish communications by other means. For example, wireless device 2802a can communicate with other wireless devices, e.g., other mobile devices, cell phones, etc., over the wireless network 2812. Likewise, mobile devices 2802a and 2802b can establish peer-to-peer communications 2820, e.g., a personal area network, by use of one or more communication subsystems, such as the Bluetooth™ communication devices. Other communication protocols and topologies can also be implemented.

The mobile device 2802a or 2802b can, for example, communicate with one or more services 2830, 2840, and 2850 over the one or more wired and/or wireless networks. For example, one or more venue services 2830 can provide venue information to mobile devices 2802a and 2802b. The venue information can include venue identifiers associated with venue maps. Survey service 2840 can receive survey data from mobile devices 2802a and 2802b, and generating location fingerprint data for venues based on the survey data. Location service 2850 can provide the location fingerprint data to mobile devices 2802a and 2802b for determining locations at each venue.

Mobile device 2802a or 2802b can also access other data and content over the one or more wired and/or wireless networks. For example, content publishers, such as news sites, Really Simple Syndication (RSS) feeds, web sites, blogs, social networking sites, developer networks, etc., can be accessed by mobile device 2802a or 2802b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
  detecting, by a mobile device, a signal, the signal being associated with a signal source identifier identifying a signal source;
  determining, from location fingerprint data, a first portion of a venue associated with the signal source identifier, the location fingerprint data including expected measurements of signals at various areas of the venue and expected identifiers of signal sources detectable at the various areas of the venue, the first portion of the venue including areas in the venue where signals from the signal source are expected to be detectable;
  designating a set of randomly selected locations in the first portion of the venue as estimated initial locations; and
  iteratively determining an estimated location of the mobile device, comprising, in each iteration:
    determining a set of candidate locations of the mobile device based on the estimated initial locations, comprising:
      determining a first portion of the set of candidate locations in the first portion of the venue;
      determining a second portion of the set of candidate locations in a second portion of the venue that is different from the first portion of the venue and where signals from the signal source are expected to be undetectable;
      determining a third portion of the candidate locations outside of the venue; and
      assigning a respective weight to each of the first, second, and third portions of the candidate locations; and
    determining an estimated location of the mobile device, including filtering the weighted candidate locations by matching measurements of the signal with the expected measurements in the location fingerprint.

2. The method of claim 1, wherein:
  the signal source is a radio frequency (RF) signal source,
  the signal source identifier is a media access control (MAC) address of the RF signal source; and
  the measurements include at least one of received signal strength indicators (RSSIs) or round trip time (RTT) of RF signals from the signal source.

3. The method of claim 1, wherein:
  the first portion of the set of candidate locations is determined using locations corresponding to Gaussian random noise applied to the estimated initial locations;
  the second portion of the set of candidate locations is determined using a uniform distribution of locations in the second portion of the venue; and
  the third portion of the set of candidate locations is determined using a uniform distribution of locations outside of the venue.

4. The method of claim 1, wherein each portion of the venue is designated in the location fingerprint data using a plurality of rectangular cells, the cells forming a grid that covers the venue.

5. The method of claim 4, wherein iteratively determining the estimated location of the mobile device comprises, in each iteration, designating the filtered candidate locations as initial estimated locations in a next iteration.

6. The method of claim 5, comprising:
  determining that matching between measurements of the signal with the expected measurements of the first portion of the candidate locations is less likely than matching between the measurements of the signal and expected measurements in the second portion and the third portion of the candidate locations; and, in response, increasing a weight corresponding to the second portion of the candidate locations and the third portion of the candidate locations in the next iteration.

7. The method of claim 6, comprising:
  accumulating respective weights of the each portion of the candidate locations over time; and
  applying a threshold to respective accumulated weights for switching on or off various subsystems of the mobile device.

8. The method of claim 7, comprising:
  determining, based on a lack of matching between measurements of the signal with the expected measurements of the first portion of the venue and a lack of matching between measurements of the signal with the expected measurements of the first portion of the venue, that a probability that the mobile device is located in any cell in the venue is below a first threshold; and, in response, switching off a subsystem of the mobile device for location determination based on wireless access point signals.

9. The method of claim 8, comprising:
upon determining that the probability is below a second threshold, switching on a subsystem of the mobile device for satellite signal based location determination, wherein the first threshold is different from the second threshold.

10. The method of claim 1, wherein determining the estimated location of the mobile device comprises determining an estimated heading of the mobile device based on a joint filtering the weighted candidate locations using a first Bayesian filter that is a type of particle filter and a second Bayesian filter that is a type of Kalman filter, the second Bayesian filter using readings of a gyroscope of the mobile device or readings of a magnetometer of the mobile device as input.

11. A mobile device comprising:
one or more processors; and
a storage device storing computer instructions operable to cause the one or more processors to perform operations comprising:
  detecting, by a mobile device, a signal, the signal being associated with a signal source identifier identifying a signal source;
  determining, from location fingerprint data, a first portion of a venue associated with the signal source identifier, the location fingerprint data including expected measurements of signals at various areas of the venue and expected identifiers of signal sources detectable at the various areas of the venue, the first portion of the venue including areas in the venue where signals from the signal source are expected to be detectable;
  designating a set of randomly selected locations in the first portion of the venue as estimated initial locations; and
  iteratively determining an estimated location of the mobile device, comprising, in each iteration:
    determining a set of candidate locations of the mobile device based on the estimated initial locations, comprising:
      determining a first portion of the set of candidate locations in the first portion of the venue;
      determining a second portion of the set of candidate locations in a second portion of the venue that is different from the first portion of the venue and where signals from the signal source are expected to be undetectable;
      determining a third portion of the candidate locations outside of the venue; and
      assigning a respective weight to each of the first, second, and third portions of the candidate locations; and
    determining an estimated location of the mobile device, including filtering the weighted candidate locations by matching measurements of the signal with the expected measurements in the location fingerprint.

12. The mobile device of claim 11, wherein:
the signal source is a radio frequency (RF) signal source, the signal source identifier is a media access control (MAC) address of the RF signal source; and
the measurements include at least one of received signal strength indicators (RSSIs) or round trip time (RTT) of RF signals from the signal source.

13. The mobile device of claim 11, wherein:
the first portion of the set of candidate locations is determined using locations corresponding to Gaussian random noise applied to the estimated initial locations;
the second portion of the set of candidate locations is determined using a uniform distribution of locations in the second portion of the venue; and
the third portion of the set of candidate locations is determined using a uniform distribution of locations outside of the venue.

14. The mobile device of claim 11, wherein each portion of the venue is designated in the location fingerprint data using a plurality of rectangular cells, the cells forming a grid that covers the venue.

15. The mobile device of claim 14, wherein iteratively determining the estimated location of the mobile device comprises, in each iteration, designating the filtered candidate locations as initial estimated locations in a next iteration.

16. The mobile device of claim 15, the operations comprising:
determining that matching between measurements of the signal with the expected measurements of the first portion of the candidate locations is less likely than matching between the measurements of the signal and expected measurements in the second portion and the third portion of the candidate locations; and, in response,
increasing a weight corresponding to the second portion of the candidate locations and the third portion of the candidate locations in the next iteration.

17. The mobile device of claim 16, the operations comprising:
accumulating respective weights of the each portion of the candidate locations over time; and
applying a threshold to respective accumulated weights for switching on or off various subsystems of the mobile device.

18. The mobile device of claim 17, the operations comprising:
determining, based on a lack of matching between measurements of the signal with the expected measurements of the first portion of the venue and a lack of matching between measurements of the signal with the expected measurements of the first portion of the venue, that a probability that the mobile device is located in any cell in the venue is below a first threshold; and, in response,
switching off a subsystem of the mobile device for location determination based on wireless access point signals.

19. The mobile device of claim 18, the operations comprising:
upon determining that the probability is below a second threshold, switching on a subsystem of the mobile device for satellite signal based location determination, wherein the first threshold is different from the second threshold.

20. The mobile device of claim 11, wherein determining the estimated location of the mobile device comprises determining an estimated heading of the mobile device based on a joint filtering the weighted candidate locations using a first Bayesian filter that is a type of particle filter and a second Bayesian filter that is a type of Kalman filter, the second Bayesian filter using readings of a gyroscope of the mobile device or readings of a magnetometer of the mobile device as input.

21. A non-transitory computer-readable medium storing computer instructions operable to cause one or more processors of a mobile device to perform operations comprising:
detecting, by a mobile device, a signal, the signal being associated with a signal source identifier identifying a signal source;
determining, from location fingerprint data, a first portion of a venue associated with the signal source identifier, the location fingerprint data including expected measurements of signals at various areas of the venue and expected identifiers of signal sources detectable at the various areas of the venue, the first portion of the venue including areas in the venue where signals from the signal source are expected to be detectable;

designating a set of randomly selected locations in the first portion of the venue as estimated initial locations; and iteratively determining an estimated location of the mobile device, comprising, in each iteration:

determining a set of candidate locations of the mobile device based on the estimated initial locations, comprising:

determining a first portion of the set of candidate locations in the first portion of the venue;

determining a second portion of the set of candidate locations in a second portion of the venue that is different from the first portion of the venue and where signals from the signal source are expected to be undetectable;

determining a third portion of the candidate locations outside of the venue; and assigning a respective weight to each of the first, second, and third portions of the candidate locations; and determining an estimated location of the mobile device, including filtering the weighted candidate locations by matching measurements of the signal with the expected measurements in the location fingerprint.

22. The non-transitory computer-readable medium of claim 21, wherein:

the signal source is a radio frequency (RF) signal source, the signal source identifier is a media access control (MAC) address of the RF signal source; and the measurements include at least one of received signal strength indicators (RSSIs) or round trip time (RTT) of RF signals from the signal source.

23. The non-transitory computer-readable medium of claim 21, wherein:

the first portion of the set of candidate locations is determined using locations corresponding to Gaussian random noise applied to the estimated initial locations;

the second portion of the set of candidate locations is determined using a uniform distribution of locations in the second portion of the venue; and the third portion of the set of candidate locations is determined using a uniform distribution of locations outside of the venue.

24. The non-transitory computer-readable medium of claim 21, wherein each portion of the venue is designated in the location fingerprint data using a plurality of rectangular cells, the cells forming a grid that covers the venue.

25. The non-transitory computer-readable medium of claim 24, wherein iteratively determining the estimated location of the mobile device comprises, in each iteration, designating the filtered candidate locations as initial estimated locations in a next iteration.

26. The non-transitory computer-readable medium of claim 25, the operations comprising:

determining that matching between measurements of the signal with the expected measurements of the first portion of the candidate locations is less likely than matching between the measurements of the signal and expected measurements in the second portion and the third portion of the candidate locations; and, in response, increasing a weight corresponding to the second portion of the candidate locations and the third portion of the candidate locations in the next iteration.

27. The non-transitory computer-readable medium of claim 26, the operations comprising:

accumulating respective weights of the each portion of the candidate locations over time; and applying a threshold to respective accumulated weights for switching on or off various subsystems of the mobile device.

28. The non-transitory computer-readable medium of claim 27, the operations comprising:

determining, based on a lack of matching between measurements of the signal with the expected measurements of the first portion of the venue and a lack of matching between measurements of the signal with the expected measurements of the first portion of the venue, that a probability that the mobile device is located in any cell in the venue is below a first threshold; and, in response, switching off a subsystem of the mobile device for location determination based on wireless access point signals.

29. The non-transitory computer-readable medium of claim 28, the operations comprising:

upon determining that the probability is below a second threshold, switching on a subsystem of the mobile device for satellite signal based location determination, wherein the first threshold is different from the second threshold.

30. The non-transitory computer-readable medium of claim 21, wherein determining the estimated location of the mobile device comprises determining an estimated heading of the mobile device based on a joint filtering the weighted candidate locations using a first Bayesian filter that is a type of particle filter and a second Bayesian filter that is a type of Kalman filter, the second Bayesian filter using readings of a gyroscope of the mobile device or readings of a magnetometer of the mobile device as input.

* * * * *